(12) United States Patent
Gentry et al.

(10) Patent No.: US 8,256,015 B2
(45) Date of Patent: Aug. 28, 2012

(54) METHOD AND APPARATUS FOR AUTHENTICATION OF DATA STREAMS WITH ADAPTIVELY CONTROLLED LOSSES

(75) Inventors: Craig B. Gentry, Mountain View, CA (US); Alejandro Hevia, Seal Beach, CA (US); Ravi Kumar Jain, Palo Alto, CA (US); Toshiro Kawahara, Saratoga, CA (US); Zulfikar Amin Ramzan, San Mateo, CA (US)

(73) Assignee: NTT DoCoMo, Inc., Tokyo (JP)

( * ) Notice: Subject to any disclaimer, the term of this patent is extended or adjusted under 35 U.S.C. 154(b) by 87 days.

(21) Appl. No.: 12/560,959

(22) Filed: Sep. 16, 2009

(65) Prior Publication Data

US 2010/0005309 A1 Jan. 7, 2010

Related U.S. Application Data

(62) Division of application No. 10/543,640, filed as application No. PCT/US2004/025513 on Aug. 4, 2004.

(60) Provisional application No. 60/495,787, filed on Aug. 15, 2003.

(51) Int. Cl.
*H04L 29/06* (2006.01)

(52) U.S. Cl. ......................................................... 726/30

(58) Field of Classification Search ...................... 726/30
See application file for complete search history.

(56) References Cited

U.S. PATENT DOCUMENTS

| | | | |
|---|---|---|---|
| 6,065,008 A | 5/2000 | Simon et al. | |
| 6,490,627 B1 | 12/2002 | Kalra et al. | |
| 6,886,098 B1 * | 4/2005 | Benaloh | 713/193 |
| 6,959,384 B1 | 10/2005 | Serret-Avila | |
| 6,970,602 B1 | 11/2005 | Smith et al. | |
| 2003/0123546 A1 * | 7/2003 | Falik et al. | 375/240.12 |
| 2003/0126400 A1 | 7/2003 | Debiez et al. | |
| 2004/0196972 A1 * | 10/2004 | Zhu et al. | 380/45 |
| 2010/0005310 A1 | 1/2010 | Gentry et al. | |

OTHER PUBLICATIONS

Office Action dated Mar. 22, 2010 in U.S. Appl. No. 10/543,640, 22 pages.
R. Genarro and P. Rohagti, "How to sign digital streams" Advances in Cryptology: Proceedings of CRYPTO '97, 1997.
P. Golle and N. Modadugu, "Authenticating streamed data in the presence of random packet loss" Proceedings of the Symposium on Network and Distributed Systems Security (NDSS 2001), pp. 13-22. Internet Society, Feb. 2001.

(Continued)

*Primary Examiner* — Jeffrey D Popham
(74) *Attorney, Agent, or Firm* — Haynes and Boone, LLP

(57) ABSTRACT

Methods, components, and systems for efficient authentication, either through a digital signature or message authentication codes, and verification of a digital stream sent from a source to a receiver via zero or more intermediaries, such that the source or intermediary (or both) can remove certain portions of the data stream without inhibiting the ability of the ultimate receiver to verify the authenticity and integrity of the data received. According to the invention, a source may sign an entire data stream once, but may permit either itself or an intermediary to efficiently remove certain portions of the stream before transmitting the stream to the ultimate recipient, without having to re-sign the entire stream. Applications may include the signing of media streams which often need to be further processed to accommodate the resource requirements of a particular environment. Another application allows an intermediary to choose an advertisement to include in a given slot.

45 Claims, 11 Drawing Sheets

OTHER PUBLICATIONS

Johnson, D. Molnar, D. Song, and D. Wagner, "Homomorphic signature schemes" Proceedings of RSA 2002 Cryptographer Track, 2002.

C. Y. Lin and S. F. Chen, "Issues and solutions for authenticating mpeg video" Proceedings of SPIE 3657, Security and Watermarking of Multimedia Contents. SPIE, 1999.

M. G. Luby, M. Mitzenmacher, M. Amin Shokrollanhi, D.A. Spielman, and V. Stemann "Practical loss-resilient codes" Proceedings of the $29^{th}$ ACM Symposium on the Theory of Computing (STOC 1997), May 1997.

S. Miner and J. Staddon "Graph-based authentication of digital streams" Editor: Francis M. Titsworth, Proceedings of the 2001 IEEE Symposium on Security and Privacy, pp. 232-246, IEEE Computer Society May 14-16, 2001.

A. Perrig, R. Canetti, J.D. Tygar, and D. Song "Efficient authentication and signing of multicast streams over lossy channels" Proceedings of the IEEE Symposium on Research in Security and Privacy. IEEE Computer Society, Technical Committee on Security and Privacy, IEEE Computer Society Press, May 2000.

A. Perrig, R. Canetti, D. Song, and D. Tygar "Efficient and Secure Source Authentication for Multicast" Proceedings of the Symposium on Network and Distributed Systems Security (NDSS 2001). Internet Society, Feb. 2001.

M. Rabin "Efficient dispersal of information for security, load balancing, and fault tolerance" Journal of the ACM, 36(2): 335-348, 1989.

R. L. Rivest, A. Shamir, and L. Adleman "A method for obtaining digital signatures and public-key cryptosystems" Communications of the ACM, 21:120-126, 1978.

C.K. Wong and S.S. Lam "Digital signatures for flows and multicasts" vol. 7, pp. 502-513, Aug. 1999.

Wang et al., "Forward Error-Correction Coding," Crosslink, Winter 2001/2001 Issue, pp. 26-29.

Schneier, Bruce, "Applied Cryptography," Second Edition, 1996, pp. 1-11.

Office Action dated Sep. 23, 2010 in U.S. Appl. No. 12/560,963, 13 pages.

Office Action dated Jan. 10, 2011 in U.S. Appl. No. 10/543,640, 37 pages.

Office Action dated Jan. 18, 2011 in corresponding JP Patent Application No. 2006-523251, 3 pages.

English Translation of Office Action dated Jan. 18, 2011 in corresponding JP Patent Application No. 2006-523251, 2 pages.

Kunihiko Miyazaki, "Digital Document Sanitizing Problem," IPSJ SIG Technical Reports, Information Processing Society of Japan, Jul. 17, 2003, vol. 2003 p. 61-67.

Partial English Translation of Kunihiko Miyazaki, "Digital Document Sanitizing Problem," IPSJ SIG Technical Reports, Information Processing Society of Japan, Jul. 17, 2003, vol. 2003.

\* cited by examiner

METHOD AND APPARATUS FOR AUTHENTICATION OF DATA STREAMS WITH ADAPTIVELY CONTROLLED LOSSES

CROSS-REFERENCE TO RELATED APPLICATIONS

The present application is a division of U.S. patent application Ser. No. 10/543,640 filed on Jul. 28, 2005, incorporated herein by reference, which is a 35 U.S.C. 371 National Stage Entry of PCT/US2004/025513 filed on Aug. 4, 2004, which claims priority under 35 U.S.C. §119(e) to Provisional Application No. 60/495,787 filed Aug. 15, 2003, all of which are incorporated herein by reference.

BACKGROUND OF THE INVENTION

1. Field of the Invention

The present invention relates to data stream authentication, and more specifically to authentication schemes with adaptively controlled packet loss.

2. Description of the Related Art

In many cases, it is desirable to append authentication information to a stream of data to assure a recipient that the data came from a specific source and was not modified en-route. For example, if the data is being provided to an application, then it would be important for the application that the data has not been corrupted either maliciously or by accident.

In cryptography, there are two traditional mechanisms for permitting such authentication:

1. Message Authentication Codes (MAC)
2. Digital Signatures

With a MAC, both the original source and the ultimate receiver must possess knowledge of a shared secret key. The sender applies a mathematical transformation involving the original data and secret key, and produces a tag. The receiver can then apply a similar transformation with the data, the tag, and the secret key to verify the origin and the integrity of the data.

With Digital Signatures, the key is split into two parts: a secret signing key and a public verification key. The public verification key can be used to verify anything signed using the secret signing key. The key is split in such a way that it is not possible to derive the private portion from the public portion. The sender applies a mathematical transformation involving the original data and secret signing key, and produces a signature. The recipient can then apply a similar transformation with the data, the signature, and the public verification key to ascertain the identity of the sender and the integrity of the data.

Digital signatures have a non-repudiation property that MACs do not. Namely, the signer cannot later deny having signed the document since the signing key is secret and was in the signer's possession. Of course, the signature owner can always claim that the secret signing key was stolen by some adversary.

Because of their nature, traditional authentication schemes do not tolerate any transformations to the data made by the source or by an intermediate. If a document is modified after it is signed, the verification step will so indicate, and will fail.

But for many applications, it is not only convenient, but sometimes necessary, to permit some specific types of modifications. For example, scalable video coding schemes, a high-level picture of the principle of which is shown in FIG. 1, have the property that a subset of the stream can be decoded and the quality is commensurate with the amount decoded. These schemes may encode video into a base layer and then zero or more "enhancement" layers. Just the base layer alone would be sufficient to view the stream. Enhancement layers are utilized to improve the overall quality.

Now, in an environment that is resource constrained, one might want to strip the enhancement layers and only send the base layers. If the entire stream has been digitally signed or authenticated in conventional ways, then by removing the enhancement layers, the original tag or signature becomes invalid. Thus the entire stream would have to be re-authenticated.

Alternatively, one may want to splice several streams of different qualities as in a simulcast situation. There may be one high-quality version of the stream, one medium-quality version of the stream, and one low-quality version of the stream. If network resources are available, then the high-quality stream may be sent, but if the network congestion goes up, then one may want to shift to the medium or low quality streams. In an alternate scenario, it could be the case that the receiver is mobile and is leaving one network environment and entering another that has different resource restrictions. The splicing situation can be considered a special case of a lossy situation where the quality of signal transmission is poor or otherwise is degraded, for example, by viewing the three data streams as one huge layered stream and imagining that two out of three frames are being discarded.

Yet another application is dynamic advertising. A source may include in a given slot a number of advertisements that can be displayed. An intermediary can then choose from among these choices which advertisement it would like to display. The choice can, for example, be based upon what the intermediary thinks will be the best advertisement for the target audience. The advertisements themselves can be created by an intermediary or some other party, and can be provided to the source either in their original form or may be hashed. The source would then include them when signing the stream.

Thus, signature schemes that can handle these types of losses in a secure manner are needed. Here, "secure" means that the ultimate end receiver can determine with overwhelmingly high confidence that the data it receives comes from a stream that was originally signed validly, but for which certain portions were removed. In addition, there is also a need for an intermediary that can adaptively and intelligently decide which blocks to drop.

One conventional solution to the controlled loss authentication problem is to authenticate each packet individually. This solution has two substantial drawbacks. First, in the case of using digital signatures, a fairly expensive computation must be performed for each packet. Second, in both the digital signature and MAC case, authentication information must be appended to each packet, which may not be feasible in consideration of efforts to remove portions of the stream stem to meet bandwidth constraints.

In C. K. Wong and S. S. Lam, Digital Signatures for Flows and Multicasts—IEEE/ACM Transactions on Networking, 7(4):502:513, August 1999, the authors propose a solution in which each data element is hashed, and then the resulting hashes are digested using a Merkle-tree. The root of the Merkle tree is authenticated. Then, with each data element, the co-nodes are sent, thereby allowing the receiver to authenticate without it. Since Wong and Lam deal with per-packet authentication, each packet contains authentication information. In particular, if $|v|$ is the size, in bytes, of a Merkle tree node, $h$ is the height of the Merkle tree, then each data element transmitted must be accompanied by $|v| \times |h|$ bytes. Thus, this approach does not deal with the controlled loss authentication problem, and is not bandwidth efficient.

In R. Johnson, D. Molnar, D. Song, and D. Wagner, Homomorphic Signature Schemes—RSA 2002, Cryptographer's Track, the authors propose a redactable signature scheme. It permits certain specific transformations on the data while still allowing the receiver to verify. It also allows arbitrary deletion of substrings in a signed document and has applications for censoring. Suppose n message blocks $m=m_1, \ldots, m_n$ are to be signed, and assume that n is a power of 2. The scheme starts with an initial secret key k and uses it to generate n keys $k_1, \ldots, k_n$ with the aid of a tree-like construction such as that of Goldreich, Goldwasser, and Micali (GGM), O. Goldreich, S. Goldwasser, and S. Micali, How to Construct Random Functions, Journal of the ACM, vol. 33, No. 4, 1986, pages 210-217. Then, to sign message m, the triplets $(0, m_1, k_1), \ldots, (0, m_n, k_n)$ are hashed in a Merkle-like tree and the root r is signed to produce the signature s. The difference between this tree and a regular Merkle tree is that the value 1 is pre-pended before the internal hashes are computed. With knowledge of k, anyone can verify s. However, in order to censor the data stream, the value of k is never published. Instead, only certain intermediate values of the GGM tree are published. These values correspond to the information needed to derive the final keys $k_i$ corresponding to the data elements which are not censored. With uncensored blocks, the intermediate GGM values, and the co-nodes in the Merkle-like tree, the signature can be verified. However, the above Homomorphic Signature Scheme takes precautions, via a GGM tree, to protect the confidentiality of censored data and requires all uncensored message blocks, all co-nodes, and all keying information in order to permit verification, and thus is not efficient.

Accordingly, there has been a need for a secure authentication scheme that permits controlled removal of certain blocks in a stream without weakening the receiver's ability to verify the authentication information, and without requiring confidentiality of censored data.

SUMMARY OF THE INVENTION

In view of the foregoing, it is an object of the present invention to provide schemes for secure authentication under adaptive data loss both in the symmetric setting (with MAC) or in the asymmetric setting (with digital signatures), which are efficient with respect to the computation requirements of the sender, receiver, and intermediary, as well as the bandwidth requirements of the channels over which these parties communicate.

Briefly, the present invention addresses the following problems:
1. adaptive loss (subsequence) authentication, wherein data chunks are removed arbitrarily;
2. simulcast authentication, wherein several data streams are intertwined and only one data chunk is taken at a time from a given stream, and the data from the other streams is dropped; and
3. adaptively lossy simulcast authentication, wherein sometimes the entire data chunk is dropped altogether.

The present invention provides the following schemes:
1. Linear Scheme for Subsequence Authentication;
2. Linear Scheme for Simulcast Authentication;
3. Tree Scheme for Subsequence Authentication; and
4. Tree Scheme for Simulcast Authentication.

Each of the above schemes may incorporate either a digital signature or a MAC. Therefore, the present invention implicitly provides 8 (=4×2) schemes.

The schemes use cryptographic hash functions to process the blocks of the original stream and create a short digest. A digital signature or MAC is then applied to the digest, thereby providing authentication information. If the receiver is given the entire stream, then it can recompute the digest and verify the signature. When specific portions of the stream need to be removed, the remover sends information that allows the receiver to efficiently compute the digest. The amount of information provided to the receiver in this setting is related to the output size of the cryptographic hash function and is otherwise independent of the actual data stream.

According to one aspect of this invention, Linear Scheme for Subsequence Authentication, the intermediary or source can remove arbitrary blocks (irrespective of their location) while still permitting the receiver to authenticate information. The scheme involves computing a two-layer hash chain and providing the recipient with various values in this chain. The scheme is online for the receiver in the sense that the receiver does not have to incur any delay in verifying the authentication information. In an optimization and generalization to this scheme, one second layer-hash is computed for every bundle of r first-layer hashes. When r=1, the scheme is the original linear scheme for subsequence authentication. In an improvement to this scheme, several first-layer hashes are aggregated before performing the second-layer hash. Consequently, fewer second-layer hashes need to be performed.

According to a second aspect of this invention, Linear Scheme for Simulcast Authentication, the intermediary or source is provided with multiple streams and can arbitrarily switch among which stream it transmits while still permitting the receiver to authenticate information. The scheme involves computing a multi-layer hash chain and providing the recipient with various values in this chain. The scheme is online for the receiver in the sense that the receiver does not have to incur any delay in verifying the authentication information.

According to a third aspect of this invention, Tree Scheme for Subsequence Authentication, the intermediary or source can remove arbitrary blocks (irrespective of their location) while still permitting the receiver to authenticate information. The scheme involves computing a hash tree and providing the recipient with various values in this tree. In the case that some subset (of size greater than one) of dropped blocks constitute a subtree of the hash tree, the hashed scheme is more efficient with respect to bandwidth than the corresponding linear scheme. The scheme is not online for the receiver in the sense that the receiver must wait for all blocks before being able to verify the authentication information.

According to a fourth aspect of this invention, Tree Scheme for Simulcast Authentication, the intermediary or source is provided with multiple streams and can arbitrarily switch among which stream it transmits while still permitting the receiver to authenticate information. The scheme involves computing a hash tree and providing the receiver with various values in this tree. The scheme is not online for the receiver in the sense that the receiver must wait for all blocks before being able to verify the authentication information.

In all aspects of this invention, it is assumed that the sender has possession of all data to be signed at the onset. In most cases, such as when media is pre-recorded, this will not be a concern. In the case of a live stream, the present invention breaks the stream into smaller chunks and applies the schemes specified herein. Those skilled in the art will recognize that variations and modifications can be made without departing from the spirit of the invention.

The present invention permits a situation in which an intermediary may adaptively and intelligently decide which blocks are to be dropped. The schemes of the present invention readily adapt to any model for dropping blocks. Moreover, the intermediary is not required to know of any cryptographic keying material. Furthermore, if the source provides the intermediary with various hash values, then the intermediary can avoid having to do any cryptographic related computation. Instead, it just has to forward the blocks it desired together with the hash information for those blocks that are dropped.

All of the inventive schemes have the property that, given knowledge ahead of time that a given block will not be dropped, then the first layer hash on that block will not be performed. That is, the first layer hash for just that block can be replaced with the identity function (h(x)=x).

Both the linear and tree-based schemes can take advantage of correlation among blocks of data. For example, in the tree-based scheme, if a given subset of blocks has the behavior that all will be dropped or all will be kept, then these blocks can be placed as all the leaves of the same subtree. In the event that all packets in the given subset are dropped, only the root has to be transmitted. However, this concept applies even if the correlation is probabilistic. For example, if a given block being dropped makes it more likely that another block will be dropped, then these blocks should also be clustered. Likewise, in the linear schemes, if a given sequence of frames are to be all kept or dropped, these frames can be treated as a single block unit to be hashed. Then, if the entire sequence of frames is dropped only a single hash value needs to be sent.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Figure 1:
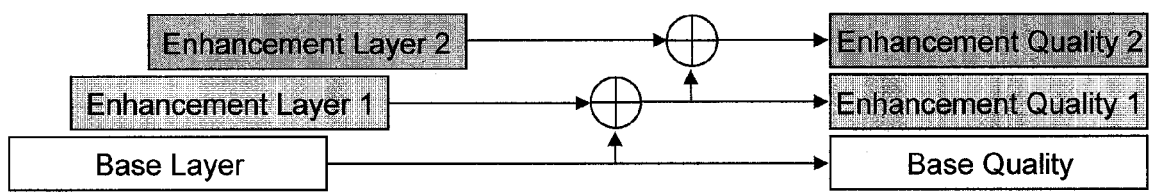
FIG. 1 shows a high-level depiction of a scalable coder.
Figure 2:
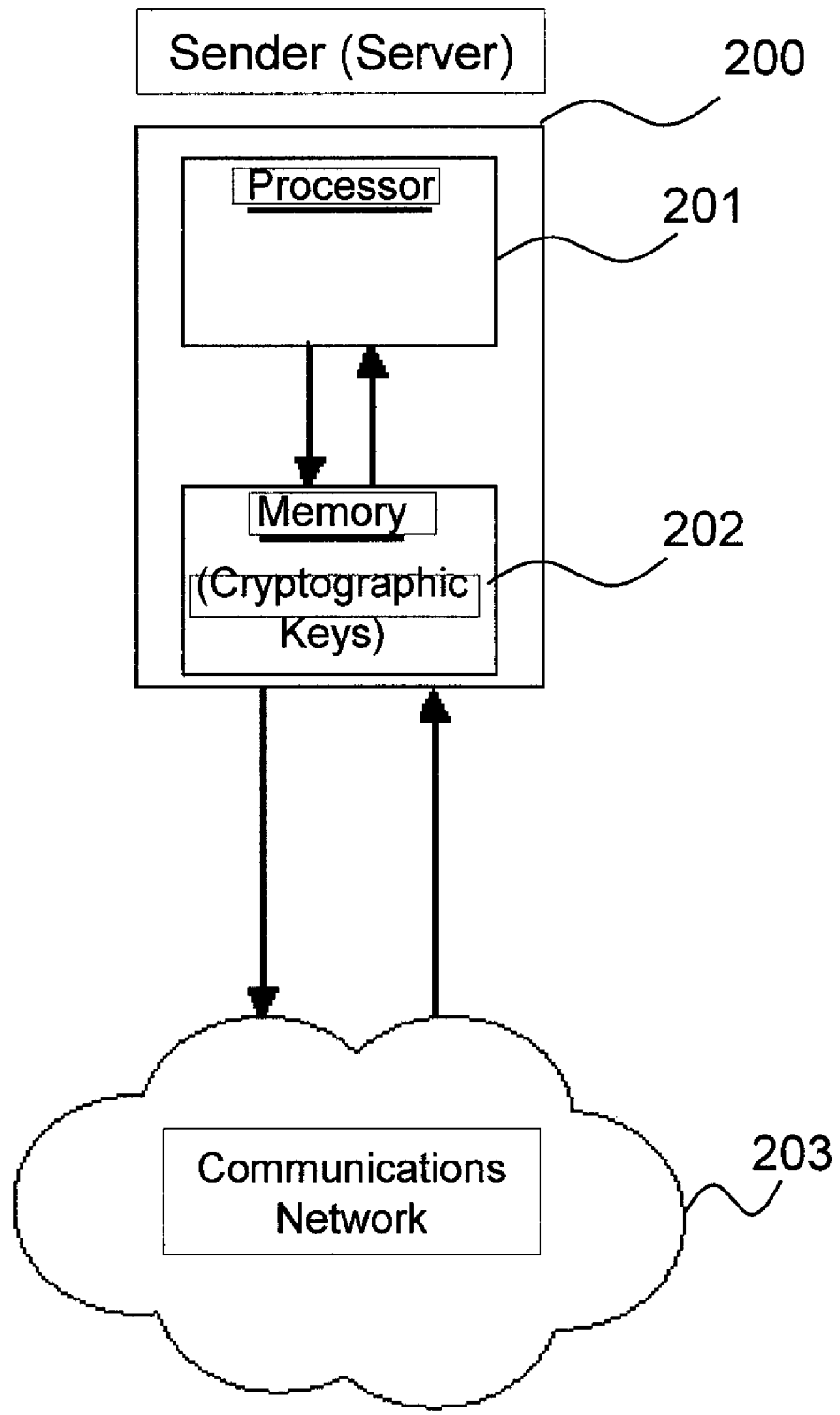
FIG. 2 shows a block diagram of a sender or source.

In the schemes of the present invention, an initial sender 200 in FIG. 2 is responsible for authenticating the data stream. As shown, each sender 200 includes a processor 201 in bidirectional communication with a memory 202. The processor 201 executes program code for carrying out the schemes of the present invention to generate, transmit or receive data streams. The memory 202 stores cryptographic keys, program codes, as well as intermediate results and other information used during execution of the schemes. A communications network 203 is provided over which the sender may communicate with receivers.

Figure 3:
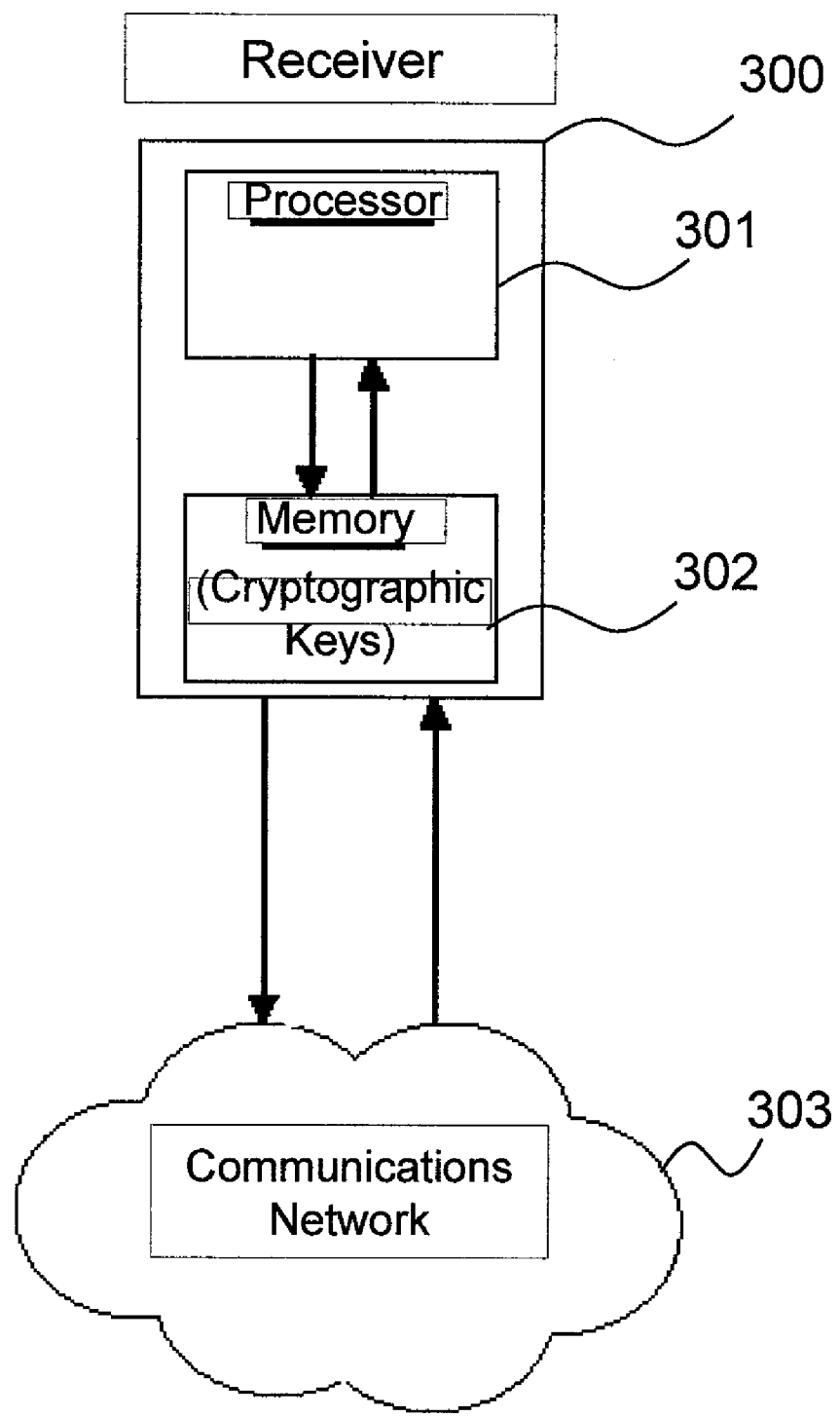
FIG. 3 shows a block diagram of a receiver.

FIG. 3 shows a block diagram of a receiver which receives data streams from the sender or server or an intermediary over a communication network according to one embodiment of the present invention. The system of the present invention includes a number of receivers, which verify the received data. Each receiver 300 includes a processor 301 in bidirectional communication with a memory 302. The processor 301 executes program code for carrying out the schemes of the present invention to generate, transmit, and receive data streams. Program code may be created according to methods known in the art. The memory 302 stores cryptographic keys and the program code, as well as intermediate results and other information used during execution of the schemes.

A communications network 303 is provided over which the sender and the receivers may communicate. The communications network may be of various common forms, including, for example, a local area network (LAN), a wide area network (WAN), and/or a mobile telephone network. The network may permit either wired or wireless communications.

Figure 4:
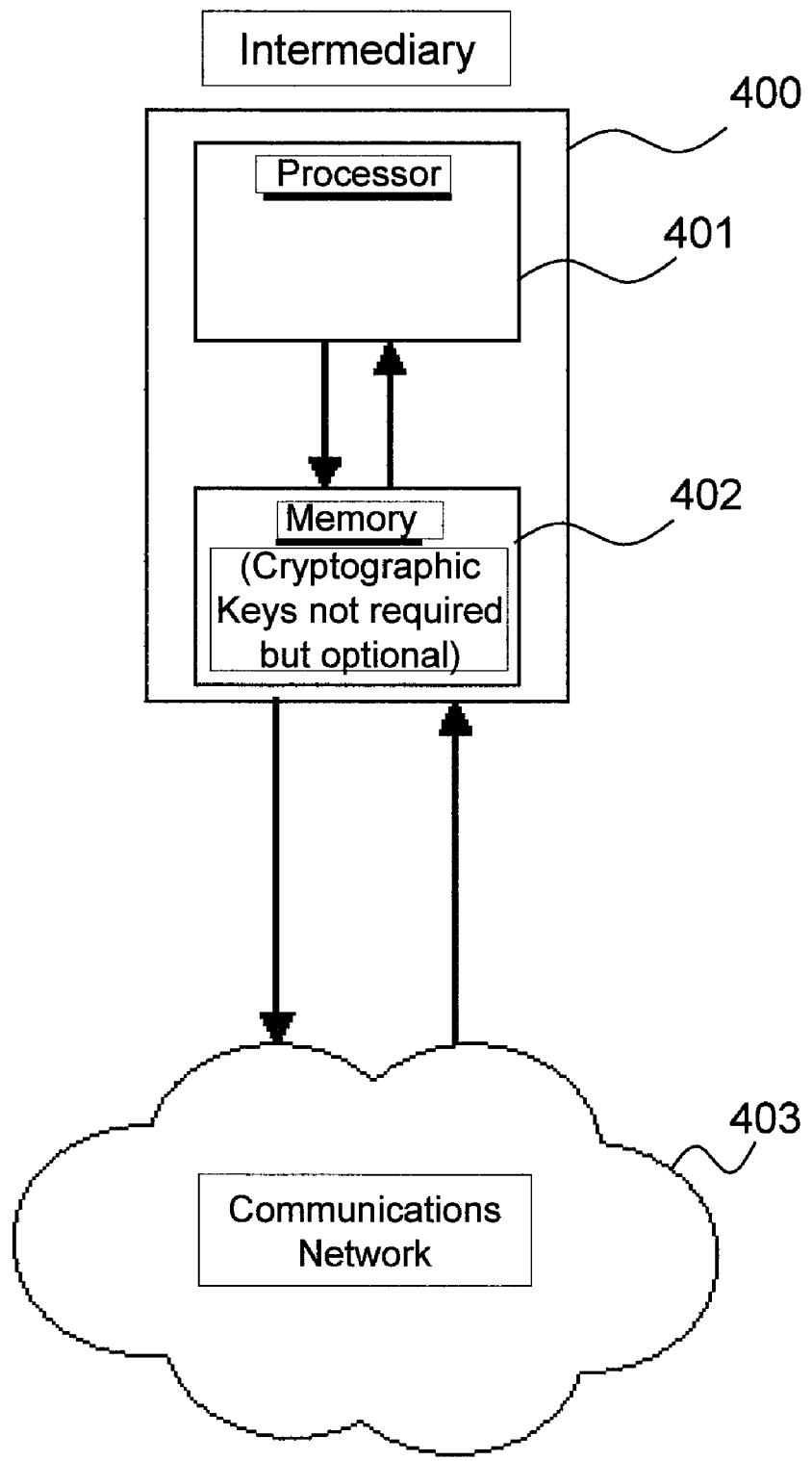
FIG. 4 shows a block diagram of an intermediary.

FIG. 4 shows a block diagram of an intermediary. There may be more than one intermediary; alternatively, the source and intermediary may be identical. If the intermediary and source are not identical, then the intermediary needs not have any cryptographic keying material. The data for the sender may pass through one or more intermediaries shown in FIG. 4 on its way to the sender or receiver. The intermediaries may choose to perform certain transformations on the data. Each intermediary 400 includes a processor 401 in bidirectional communication with a memory 402. The processor 401 executes program code for carrying out the schemes of the present invention to generate, transmit, and receive data streams. The memory 402 may store cryptographic keys.

Figure 5:
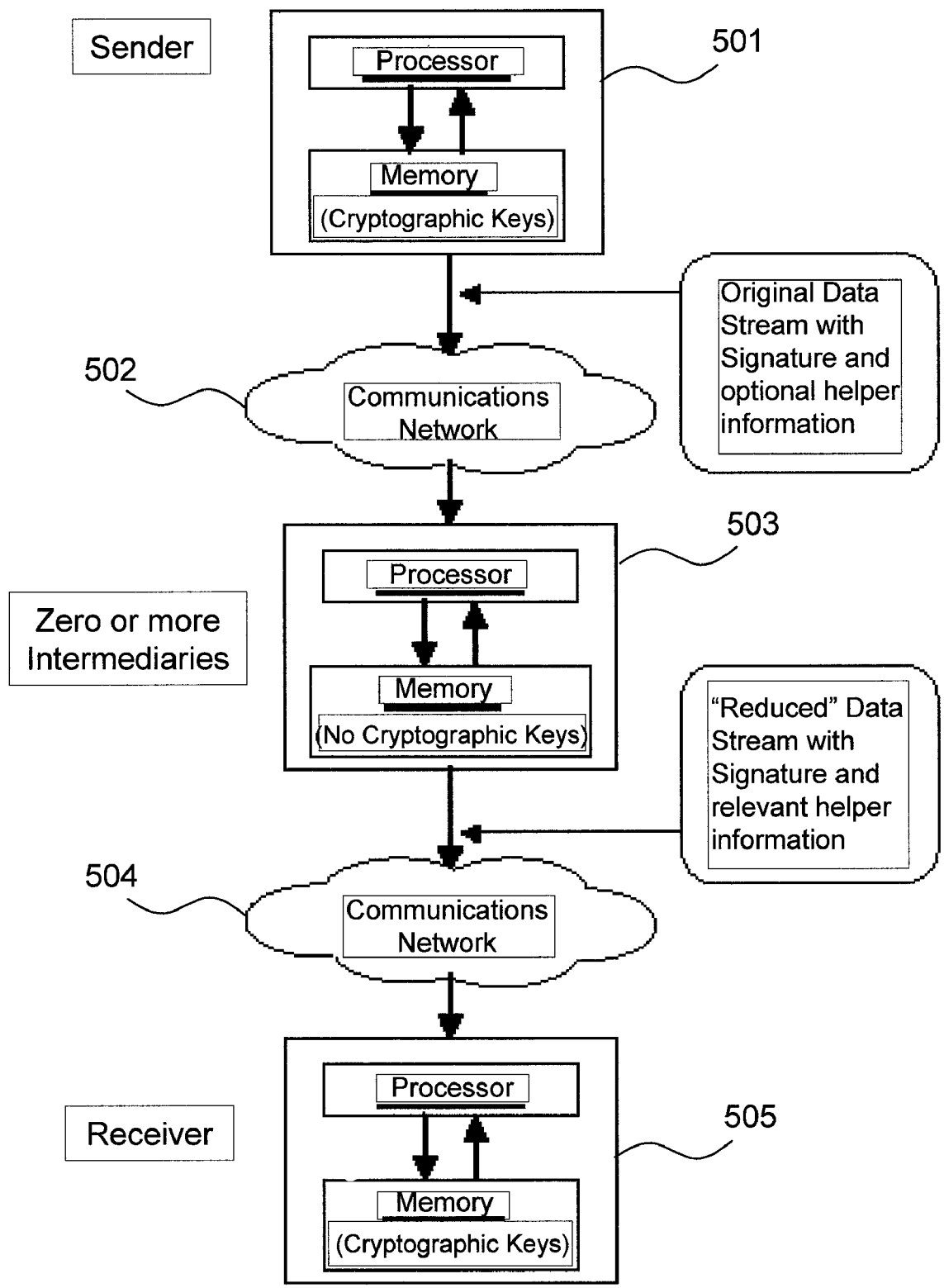
FIG. 5 shows a block diagram of a system including a sender, a receiver, and an intermediary.

FIG. 5 shows a block diagram of a system according to one embodiment of the present invention, including a sender 501, an intermediary 503, a receiver 505, and communication networks 502 and 504. As shown, the sender 501 transmits an original data stream with signature and optional helper information to the intermediary 503 via the communication network 502, which then transmits a reduced data stream with signature and relevant helper information to receiver 505 via communication network 504.

The above-mentioned transformations involve removing certain portions of the data. If an intermediary modifies the data stream, it will determine what information, if any, is required by the receiver to verify the authentication information associated with the stream.

M denotes a media stream that can be broken up into n blocks of length b: $M=M_1M_2 \ldots M_n$, $|M_i|=b$, $1 \leq i \leq n$. H denotes a cryptographic compression function that takes as input a b-bit payload as well as a v-bit initialization vector or IV, and produces a v-bit output where typically v<b. These cryptographic compression functions are collision resistant, that is, it is hard to find two inputs $m_1$ and $m_2$ with $m_1 \neq m_2$ such that $H(IV,m_1)=H(IV,m_2)$ for a fixed IV. It is assumed that there is a standard IV, called $IV_0$, that is fixed and publicly known. For notational simplicity, the description below will not explicitly list the IV as an argument in the hash function— though it should be thought of as being there implicitly.

Examples of such cryptographic compression functions are found in SHA-1 or MD5. The compression function in SHA-1 has an output and IV size of 160-bits whereas the compression function in MD5 works with 128-bit values. Both allow for a 512-bit payload size. When it is necessary to operate on data blocks that are larger than the payload size, application of the compression function is repeated. Functions that operate as such while still retaining the collision resistance property are termed cryptographic hash functions.

For simplicity, this term is used below even if a data block that fits within the payload is dealt with.

For the schemes involving digital signatures, it is assumed that a public-key infrastructure exists, and that the sender has a key pair (Pk, Sk). Sk is the sender's private signing key—which can be used for appending a digital signature to a message, and Pk is the sender's public verification key which can be used to verify the authenticity of any signature issued using Pk. σ(Sk, M) denotes the digital signature algorithm on message M under signing key Sk, and v(Pk, M, σ) denotes the verification algorithm. The intermediate does not need to know either the signing or the verification key. For the schemes involving MAC, it is assumed that both the initial sender S and the ultimate receiver R share knowledge of a symmetric key, which need not be known by the intermediaries.

The schemes of the present invention make use of conventional constructs involving cryptographic compression functions. One such construct is an iterated hash function which is built from cryptographic compression functions as follows. Suppose a message M can be broken up into n blocks of length b, and H is a cryptographic compression function with a b-bit payload and a v-bit output. The iterated hash function defined by H is the value $x_n$ where:

$$x_1 = H(IV_0, M_1)$$
$$x_2 = H(x_1, M_2)$$
$$\vdots$$
$$x_n = H(x_{n-1}, M_n)$$

Assuming that it is hard to find collisions in the compression function H, it is then hard to find collisions in the iterated hash. Typically, when one wants to digitally sign a message, an iterated hash is applied to the message, and the resulting output is signed. The methods, systems, and components of the present invention will involve similar constructions, but intermediate values will be provided to aid in verification.

Figure 6:
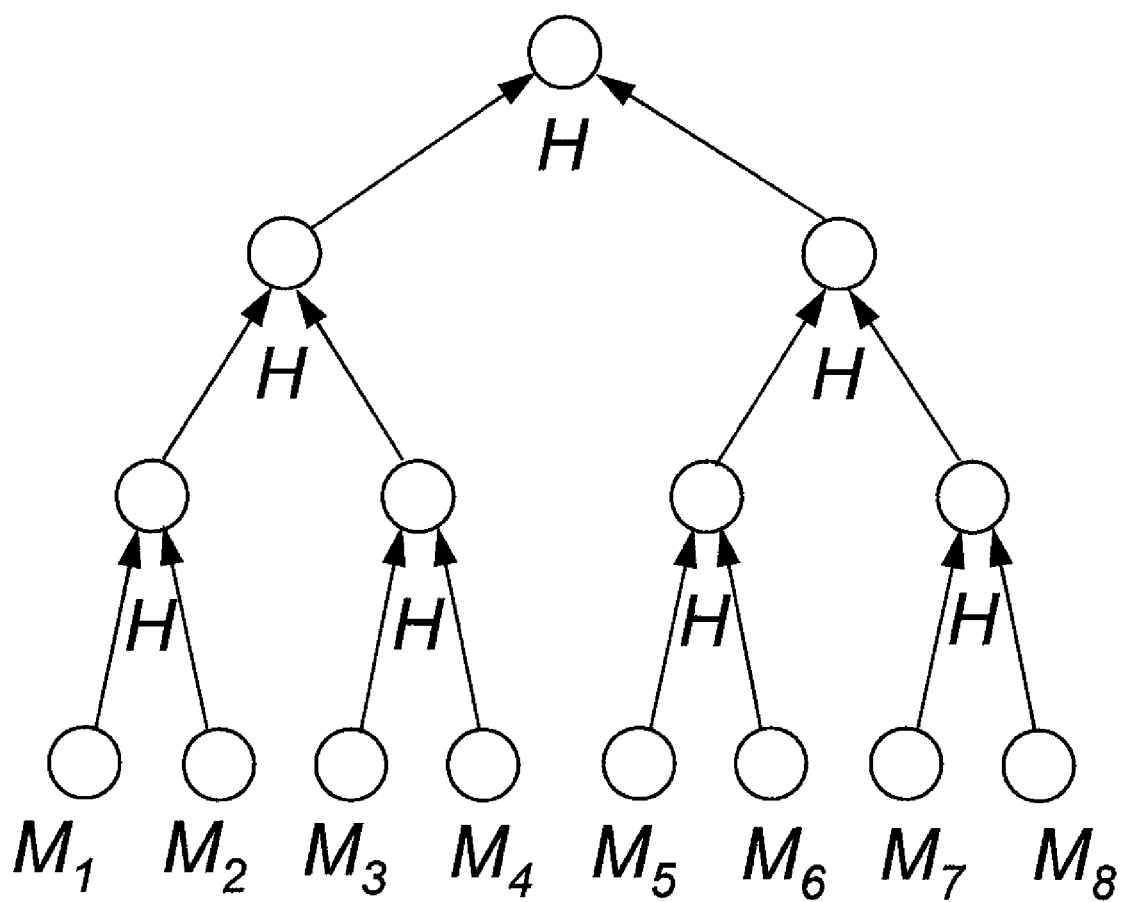
FIG. 6 illustrates a Merkle Tree with eight leaves.

Another conventional construct involving cryptographic compression functions is a Merkle tree. FIG. 6 shows a graphical depiction of a Merkle tree with eight leaves. Each leaf is the hash of the message below it. Each interior node represents the hash of its children. The root is signed. Suppose that M can be broken up into n blocks $M=M_1 \ldots M_n$. For simplicity, assume that n is a power of 2. The schemes of the present invention can incorporate powers other than 2. The Merkle tree associated with M under hash function H is a binary tree in which each node is associated with a specific value. There are n leaves, and each leaf $l_i$ takes on the hash of $M_i$—that is, $H(IV_0, M_i)$. Each interior (non-leaf) node then takes on the value associated with the hash of the concatenations of the values of its two children. That is, if vertex v has children $v_1$ and $v_2$ where $v_1$ has value $x_1$ and $v_2$ has value $x_2$, then the value associated with v is $H(IV_0, x_1 x_2)$.

Merkle trees are often used in digital signatures whereby the value assigned to the root of the tree associated with the message M forming the digest is signed. If the underlying compression or hash function is collision resistant, then it will be hard to find two different messages whose Merkle root value is identical.

The present invention also makes use of the notion of the co-nodes for a given vertex in a Merkle tree. The co-nodes of a vertex v consist of the direct siblings of the vertices on the path from v to the root. Given a vertex v and its co-nodes, one can compute the sequence of hash functions that lead from v to the root.

1. Subsequence Authentication

The linear subsequence authentication scheme of the present invention allows stream authentication even when arbitrary blocks from the message are removed. As long as the blocks sent by an intermediate node are a proper subsequence of the original message, the receiver can authenticate the stream.

1.1 Signing

Figure 7:
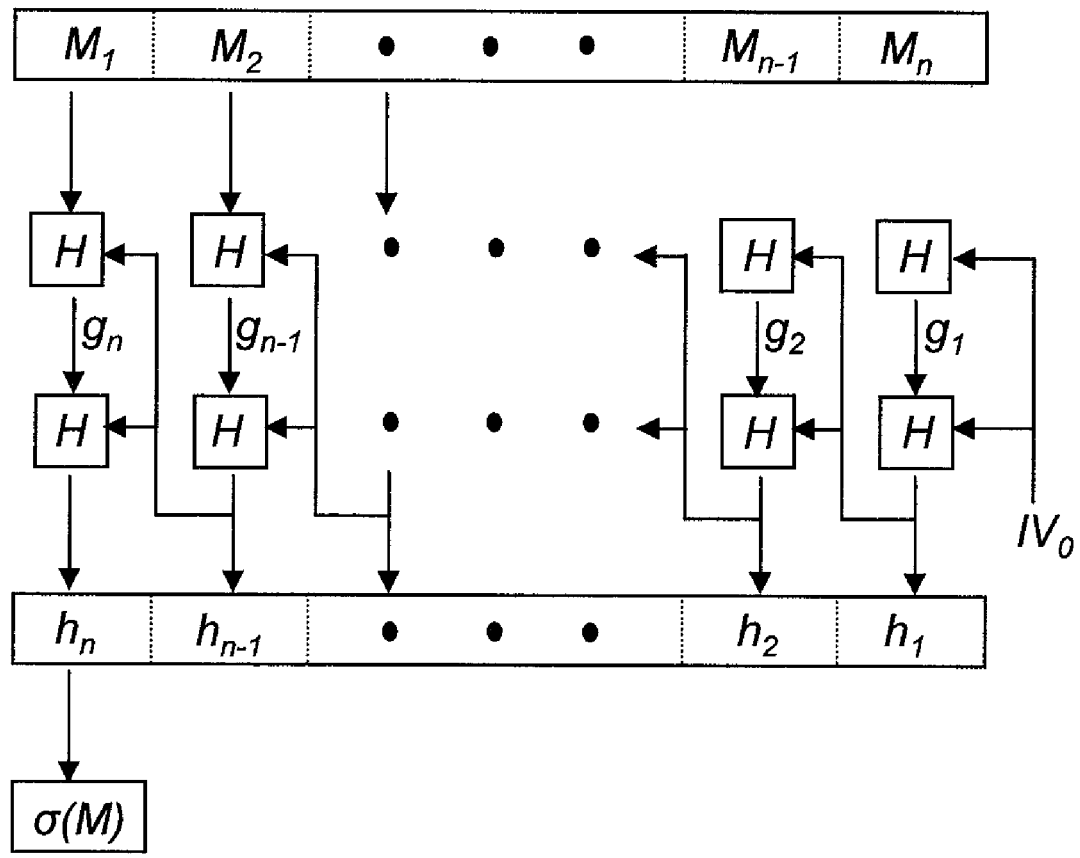
FIG. 7 illustrates a basic linear subsequence authentication scheme according to one embodiment of the present invention.

FIG. 7 illustrates a basic linear subsequence authentication scheme according to one embodiment of the present invention. Given a message M, signature generation follows a similar paradigm to an iterated hash, except that it uses "two hashing layers".

Given a message $M=M_1 M_2 \ldots M_n$, in one embodiment, the present invention generates partial hash computations $h_1, \ldots, h_n$ as follows:

$$h_0 = IV_0 \qquad (1)$$
$$g_1 = H(h_0, M_n)$$
$$h_1 = H(h_0, g_1)$$
$$g_2 = H(h_1, M_{n-1})$$
$$h_2 = H(h_1, g_2)$$
$$\vdots$$
$$g_n = H(h_{n-1}, M_1)$$
$$h_n = H(h_{n-1}, g_n)$$

In the process of computing $h_1, \ldots, h_n$, the scheme shown in FIG. 7 computes auxiliary hash values $g_1, \ldots, g_n$ which are not sent. The initial sender S transmits $(M, \sigma_{Sk}(h_n))$. The value of $IV_0$ can be used as the IV for the computation of all the $g_i$ values.

Alternatively, the sender S may decide to transmit the hash values $h_i$ along with the message blocks $\langle(M_1, h_{n-1}, \sigma_{Sk}(h_n)), (M_2, h_{n-2}), \ldots (M_n, h_0)\rangle$.

1.2 Signature Update

If an intermediate node wants to strip off k arbitrarily located message blocks, the node generates a resulting "message" M', identical to M but where k blocks have been removed. The receiver needs to be able to authenticate M'.

Given the received n-block message M, the intermediate node computes "new" blocks $M_1', \ldots, M_n'$. For each message block $M_{n-i+1}$, (starting from the end, i=1 to i=n), the intermediate node computes the corresponding auxiliary and partial hashes as follows:

$$g_i = H(h_{i-1}, M_{n-i+1}),$$

$$h_i = H(h_{i-1}, g_i) \qquad (2)$$

Depending on whether the block will be forwarded or dropped, the intermediate node computes $$M'_{n-i+1} = M_{n-i+1}, \text{ if block } M_i \text{ is forwarded, or} \qquad (3)$$
$$g_i, \text{ if block } M_i \text{ is dropped}$$

Let t be the index of the last message block that the intermediate node wants to send to the receiver, such that $M_t'=M_t$, and $M_l'\neq M_l$ for all l>t. The intermediate node finally transmits $\langle M_1', \ldots M_n' \sigma_{Sk}(h_n), h_{n-t} \rangle$ Some standard encoding is applied to the block contents to facilitate distinguishing between "message blocks" and "hashes". Skilled artisans would appreciate that there are numerous ways to perform this encoding.

Alternatively, to enable on-line verification, the intermediate node transmits $\langle (M_1', h_{n-1}, \sigma_{Sk}(h_n)), (M_2', h_{n-2}), \ldots (M_n', h_0) \rangle$

1.3 Verification

The receiver can verify the signature by computing $h_n$ from $M_1', \ldots, M_k'$ and $h_{n-t}$ as follows: for each message block $M'_{n-i+1}$ (starting from the end, i=1 to i=n), and depending on whether the received block is a "message block" or a "hash", it computes $$h_i = H(h_{i-1}, H(h_{i-1}, M'_{n-i+1})), \quad \text{if } M'_{n-i+1} \text{ is} \quad (4)$$
$$\text{a "messsage block"}$$
$$H(h_{i-1}, M'_{n-i+1})), \quad \text{if } M'_{n-i+1} \text{ is a "hash"}$$

The receiver can then verify the signature on $h_n$ as normal using the verification algorithm v.

The alternative on-line verification proceeds as follows: the receiver computes the partial hash $h_n$ from $(M'_1, h_{n-1})$ using relation (4) and then it verifies the signature on the partial hash $h_n$. Afterwards, for i=2, ..., n, it computes the partial hash $h_i$ from $(M'_i, h_{n-i})$ using (4) and verifies that the so computed hash matches the hash value received in iteration i−1.

1.4 Security

As mentioned above, the iterated hash construction is collision resistant so long as the underlying hash function H is as well. In particular, if one finds a collision in the iterated construction, then at some point there is an internal collision, which means one can find a collision on the hash function H. If an adversary can come up with a non-subsequence forgery (that is, a message/signature pair that is not obtained by merely taking a subsequence of the original message), then it is possible to show that one can demonstrate either a collision in the hash function or a forgery on the underlying signature scheme. Therefore, as long as the signature scheme is not easily susceptible to forgery and the hash function is not easily susceptible to collisions, the scheme presented above is secure.

1.5 Performance

When the intermediary removes blocks, it only needs to compute the hash of the block being removed. This computation does not involve any public-key steps and is fairly efficient. In fact, the throughput of algorithms like SHA-1 is on the order of a few hundred megabits per second. Moreover, if the intermediate nodes are resource bounded with respect to computation, the source can follow the alternative approach and include the intermediate $h_i$ values. In the case of SHA-1, each such value is 20-bytes long, so the bandwidth overhead will likely be quite small.

A tradeoff between bandwidth usage and buffering/computation is possible by sending some intermediate $h_i$ values selectively. If the receiver can store up to b message blocks, then the intermediate node can send the hash value $h_{n-b}$ only after b message blocks. Authentication can be done as described above starting from $h_{n-b}$. Then, the intermediate node sends a second "bundle" (next b message blocks and $h_{n-2b}$), which is authenticated by recomputing the partial hashes $h_{n-b}, \ldots, h_{n-2b+1}$ and then verifying the recomputed hash value $h_{n-b}$ matching the one received in the first bundle.

The computations of this embodiment do not require storing the entire stream in memory since only a single input block to the hash function is needed at any given time.

The scheme of the first embodiment permits the role of an intermediary which can adaptively and intelligently choose to remove any number of blocks without requiring knowledge of any cryptographic keying material. Moreover, the intermediary can be proximate to the receiver and can control the loss (and therefore the amount of hash information) dynamically. Furthermore, the authentication information can be verified in an online manner by the receiver. That is, the receiver can verify the authentication information as it receives the stream, and will not be required to do any form of extensive buffering. Also, the first layer hash computations are not required for any block that will not be dropped. For example, an MPEG I-frame or the base layer of a scalable coding scheme will not be intentionally dropped. For these blocks, only the second layer is required. In this instance, the first layer hash function for that block can be replaced with the identity function $f(x)=x$. In a similar spirit, if a given sequence of frames will either all be dropped or all be kept, then the above scheme is even more advantageous since it can cluster these as a single block before hashing.

2. An Efficiency Improvement to the Subsequence Authentication

The second embodiment of the present invention provides an efficiency improvement to the basic linear subsequence authentication, by aggregating several first layer hashes before performing the second layer hashes. As a result, the method according to the second embodiment performs fewer second layer hashes. For a typical compression function, such as the one accompanying SHA-1, the payload size is 64 bytes whereas the digest size is 20 bytes. As a result, in this situation, three digests can be concatenated together before the second layer function is called. In the second embodiment, it is assumed that r hashes are aggregated. In addition, for any decimal number a, $\lfloor a \rfloor$ denotes the smallest integer greater or equal than a, and $\lceil a \rceil$ denotes the largest integer less or equal than a.

2.1 Signing

Figure 8:
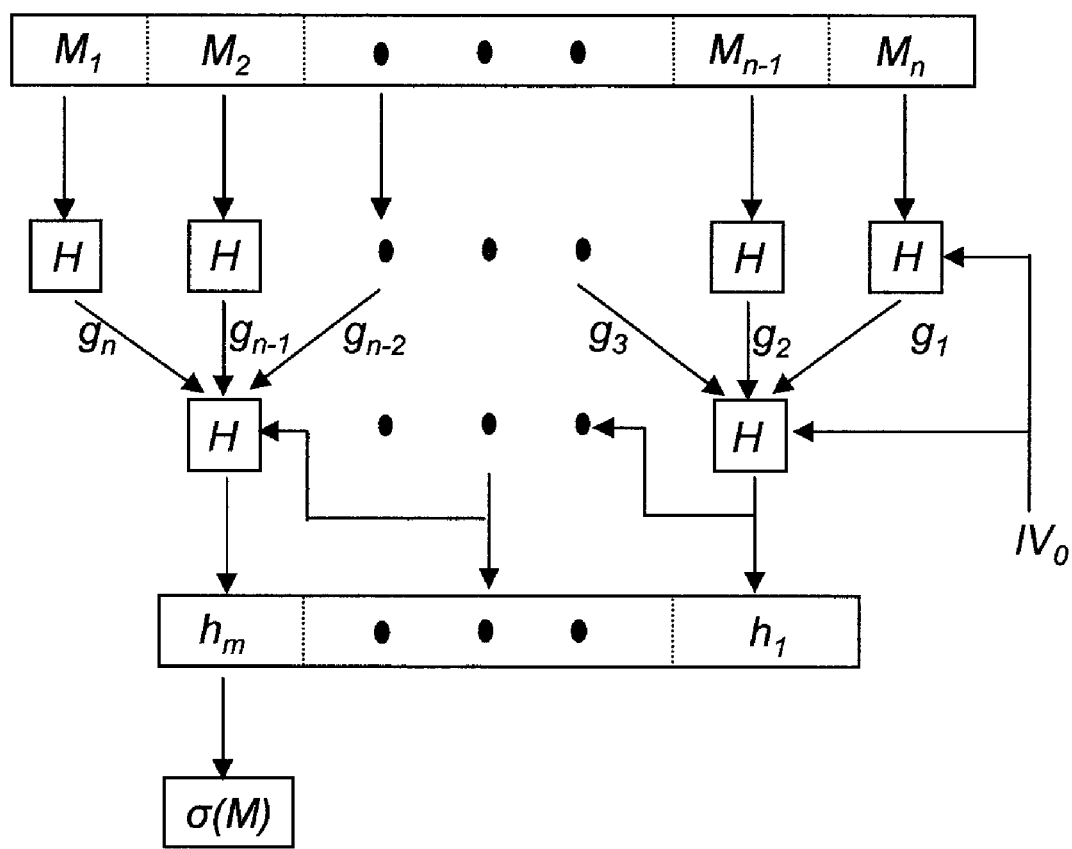
FIG. 8 illustrates an optimized linear subsequence authentication scheme with r=3 and with n a multiple of r, according to one embodiment of the present invention.

For a message M, signature generation according to the second embodiment follows a similar paradigm to the scheme of the first embodiment, and uses "two hashing layers". However, the scheme of the second embodiment involves fewer hashes than that of the first embodiment. FIG. 8 shows an improved linear subsequence authentication scheme according to one embodiment of the present invention, with r=3 and with n a multiple of r. In this scheme groups of r first-layer hashes are hashed in the second layer. Given a message $M=M_1 M_2 \ldots M_n$, the scheme of the second embodiment generates the partial hash computations $h_1, \ldots, h_m$, where $$m = \lceil \frac{n}{r} \rceil$$

as follows:

$$g_1 = H(IV_0, M_n) \quad (5)$$
$$g_2 = H(IV_0, M_{n-1})$$

-continued $$g_r = H(IV_0, M_{n-(r-1)})$$

$$h_1 = H(IV_0, g_1, \ldots, g_r)$$

$$g_{r+1} = H(IV_0, M_{n-r})$$

$$g_{r+2} = H(IV_0, M_{n-(r+1)})$$

$$\vdots$$

$$g_{2r} = H(IV_0, M_{n-(2r-1)})$$

$$h_2 = H(h_1, g_{r+1}, \ldots, g_{2r})$$

$$\vdots$$

$$g_{r\lfloor \frac{n}{r} \rfloor - r + 1} = H\left(IV_0, M_{n-(r\lfloor \frac{n}{r} \rfloor - r)}\right)$$

$$g_{r\lfloor \frac{n}{r} \rfloor - r + 2} = H\left(IV_0, M_{n-(r\lfloor \frac{n}{r} \rfloor - r + 1)}\right)$$

$$\vdots$$

$$g_{r\lfloor \frac{n}{r} \rfloor} = H\left(IV_0, M_{n-(r\lfloor \frac{n}{r} \rfloor - 1)}\right)$$

$$h_{m-1} = H\left(h_{m-2}, g_{r\lfloor \frac{n}{r} \rfloor - r + 1}, \ldots, g_{r\lfloor \frac{n}{r} \rfloor}\right)$$

$$g_{r\lfloor \frac{n}{r} \rfloor + 1} = H\left(IV_0, M_{n-(r\lfloor \frac{n}{r} \rfloor)}\right)$$

$$\vdots$$

$$g_n = H(IV_0, M_1)$$

$$h_m = H\left(h_{m-1}, g_{r\lfloor \frac{n}{r} \rfloor + 1}, \ldots, g_n\right)$$

Similarly to the scheme of the first embodiment, in the process of computing $h_1, \ldots, h_m$, the scheme of the second embodiment computes auxiliary hash values $g_1, \ldots, g_n$ which are not sent. The initial sender transmits $(M, \sigma_{Sk}(h_m))$, and the value of $IV_0$ can be used as the IV for the computation of all the $g_i$ values.

Alternatively, the sender may decide to transmit the hash value $h_i$ along with every rth message block $\langle (M_1, \sigma_{Sk}(h_m))$, $(M_2), \ldots, (M_r, h_{m-1}), (M_{r+1}), \ldots, (M_{2r}, h_{m-2}), \ldots (M_n, h_0)\rangle$.

2.2 Signature Update

Now, suppose an intermediate node wants to strip off n–k arbitrarily located message blocks. It generates a resulting "message" M', identical to M but where n–k blocks have been removed. The receiver needs to be able to authenticate M'.

Given the received n-block message M, the intermediate node computes "new" blocks $M'_1, \ldots, M'_n$. For each message block $M_{n-i+1}$ (starting from the end, i=1 to i=n), it computes the corresponding auxiliary and partial hashes $$g_i = H(IV_0, M_{n-i+1}) \quad (6)$$

Depending on whether the block will be forwarded or dropped, the intermediate node computes $$M'_{n-i+1} = M_{n-i+1}, \text{ if block } M_i \text{ is forwarded, or} \quad (7)$$

$$g_i, \text{ if block } M_i \text{ is dropped}$$

The hash values $h_m, \ldots, h_1$ are computed as in the signing operation. The intermediary finally transmits $\langle M'_1 \ldots M'_n, \sigma_{Sk}(h_m)\rangle$ The above transmission requires buffering r packets to perform verification. In practice r will be quite small. For a SHA-1 based scheme r=3 and for an MD-5 based scheme, r=4.

Alternatively, the intermediary may transmit the hash values $h_i$ along with the "new" message blocks $\langle (M_1', \sigma_{Sk}(h_m))$, $(M_2'), \ldots, (M_r', h_{m-1}), (M_{r+1}'), \ldots, (M_{2r}', h_{m-2}), \ldots, (M_n', h_0)\rangle$ 2.3 Verification The receiver can verify the signature by computing $h_m$ from $M'_1, \ldots, M'_n$ as follows. First, for each message block $M'_{n-i+1}$ (starting from the end, i=1 to i=n), and depending on whether the received block is a "message block" or a "hash", the receiver computes $$g'_i = H(h_{i-1}, M'_{n-i+1}), \text{ if } M'_{n-i+1} \text{ is a "messsage block"} \quad (8)$$

$$M'_{n-i+1}, \text{ if } M'_{n-i+1} \text{ is a "hash"}$$

Finally, the receiver computes $h_m$:

$$h_1 = H(IV_0, g'_1, \ldots, g'_r) \quad (9)$$

$$h_2 = H(h_1, g'_{r+1}, \ldots, g'_{2r})$$

$$\vdots$$

$$h_m = H\left(h_{m-1}, g_{r\lfloor \frac{n}{r} \rfloor + 1}, \ldots g_n\right)$$

The receiver can then verify the signature on $h_m$ as normal using the verification algorithm v.

To perform online verification, the receiver needs to be able to compute the intermediate hash $h_i$. To do so, the receiver needs to buffer r blocks so it can compute the appropriate g values. The online verification of this scheme is analogous to that of the first embodiment.

2.4 Security

Similarly to the first embodiment, so long as the signature scheme is not easily susceptible to forgery and the hash function is not easily susceptible to collisions, the scheme of the second embodiment is secure.

2.5 Performance

Similarly to the first embodiment, when the intermediary removes blocks, it only needs to compute the hash of the block being removed.

It takes less time for the subsequence scheme of the second embodiment to both compute and verify the signature compared to the subsequence scheme of the first embodiment, since only one second-layer hash is performed for every r first layer hashes. If r is chosen carefully (for example, setting r=3 for SHA-1 or r=4 for MD-5), then each second-layer hash only requires a single call to the compression function. So, in the second embodiment, only $$\lceil \frac{n}{r} \rceil$$

compression function calls are made in the second layer compared to the n calls in the first embodiment.

In addition to the advantages of the first embodiment, the receiver of the second embodiment can verify the authentication information after receiving every r blocks. In practice, r will be fairly small—on the order of 2 or 3, thus reducing the number of the second layer hashes.

3. Simulcast Authentication: the Multiplex Scheme

Now, assume the original sender S transmits k different streams $M^{(1)}, M^{(2)}, \ldots, M^{(k)}$ simultaneously. Each stream consists of n blocks of length b, $M^{(j)}=M_1^{(j)}, \ldots, M_n^{(j)}$. The scheme of the third embodiment allows the intermediate node not only to select one stream and retransmit it in an authenticated fashion, but also to "switch" to some other stream adaptively (at any point during block transmission). Of course, the receiver should be able to authenticate the resulting stream.

3.1 Signing

Figure 9:
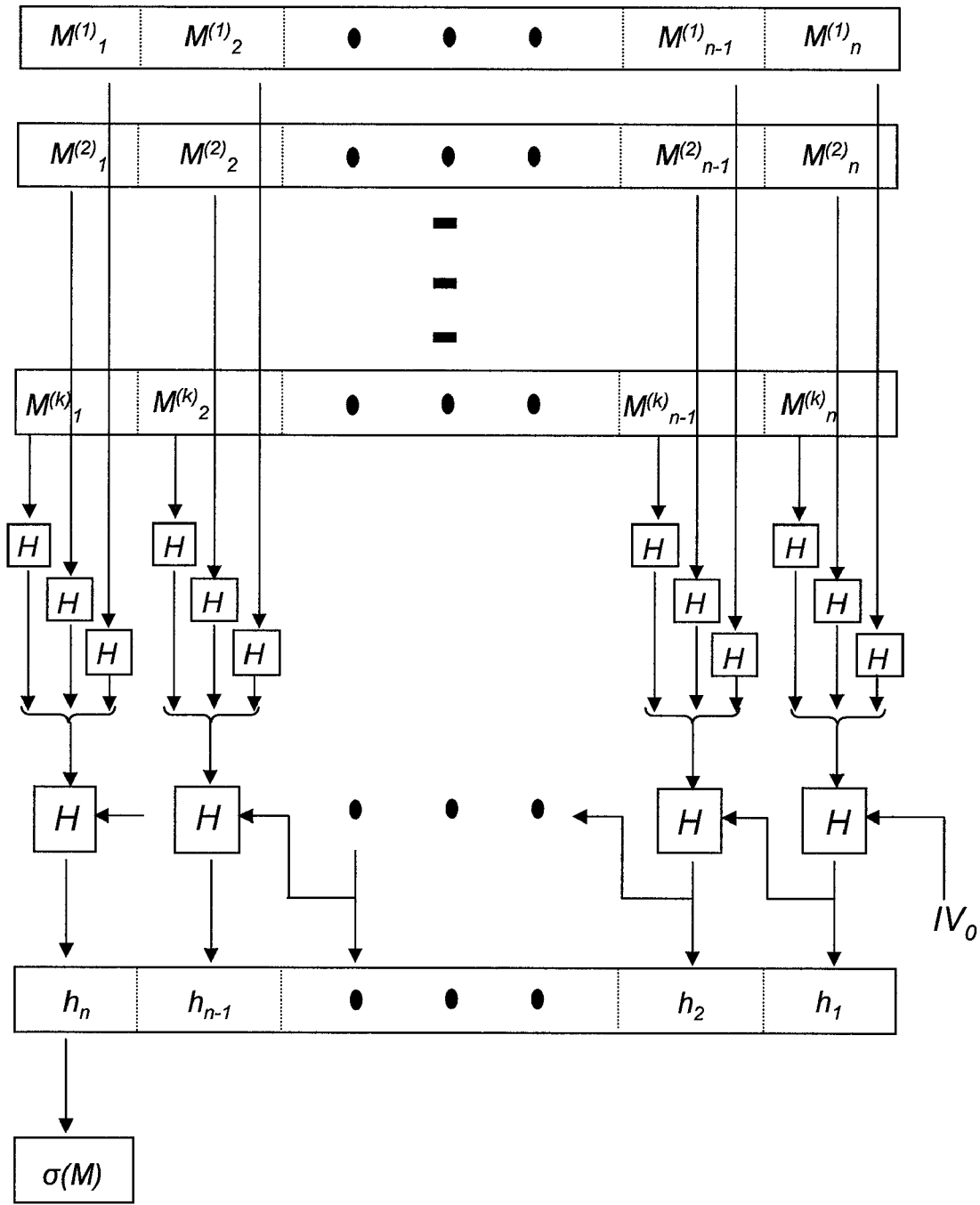
FIG. 9 illustrates a basic linear simulcast authentication scheme according to one embodiment of the present invention.

FIG. 9 shows a basic linear simulcast authentication scheme according to one embodiment of the present invention. Given a message M, signature generation follows the same approach as in the first and second embodiments, i.e., reverse iterated hash, but computing partial hashes of every block in each stream.

Given messages $M^{(1)}, M^{(2)}, \ldots, M^{(k)}$, where $M^{(j)}=M_1^{(j)}$, $M_2^{(j)}, \ldots, M_n^{(j)}$, the scheme of the third embodiment of the present invention generates the partial hash computations $h_1, \ldots, h_n$ as follows:

$$d_1^{(1)} = H(M_n^{(1)}) \quad (10)$$
$$d_1^{(2)} = H(M_n^{(2)})$$
$$\vdots$$
$$d_1^{(k)} = H(M_n^{(k)})$$
$$h_1 = H(h_0, d_1^{(1)}, \ldots, d_1^{(k)})$$
$$\vdots$$
$$d_n^{(1)} = H(M_1^{(1)})$$
$$d_n^{(2)} = H(M_1^{(2)})$$
$$\vdots$$
$$d_n^{(k)} = H(M_1^{(k)})$$
$$h_n = H(h_{n-1}, d_n^{(1)}, \ldots, d_n^{(k)})$$

The initial sender transmits $\sigma_{Sk}(h_n)$ and then sends $M^{(1)}, \ldots, M^{(k)}$ simultaneously. In practice, the message blocks of the different streams will be interleaved in the transmission.

3.2 Signature Update

Suppose an intermediate node wants to select a possibly different stream (message) for each message block received. For instance, if each message encodes a video stream of different quality, the intermediate node may want to select a lower or higher quality depending on network congestion. It generates a "resulting message" M', comprising "chunks" (consecutive message blocks) of the different streams. The intermediate node may pick a single stream (message) at each moment. It should be understood that the present invention allows for the possibility of layered streams. The receiver needs to be able to authenticate M'.

Given the received n-block messages $M^{(1)}, \ldots, M^{(k)}$, the intermediate node computes "new" blocks $M'_1, \ldots, M'_n$. For each set of message blocks $M_{n-i+1}^{(1)}, \ldots, M_{n-i+1}^{(k)}$, (starting from the end, i=1 to i=n), it computes the partial hashes $$d_i^{(1)} = H(M_{n-i+1}^{(1)}) \quad (11)$$
$$d_i^{(2)} = H(M_{n-i+1}^{(2)})$$
$$\vdots$$
$$d_i^{(k)} = H(M_{n-i+1}^{(k)})$$
$$h_i = H(h_{i-1}, d_i^{(1)}, \ldots, d_i^{(k)})$$

Then if stream l is chosen, $1 \leq l \leq k$, it computes $$M'_{n-i+1}=(d_i^{(1)}, \ldots, d_i^{(l-1)}, M_{n-i+1}^{(l)}, d_i^{(l+1)}, \ldots, d_i^{(k)}). \quad (12)$$

The intermediate node finally transmits $\langle M_1' \ldots M_n', \sigma_{Sk}(h_n) \rangle$.

Alternatively, to enable on-line verification, the intermediate node transmits $$\langle (M_1', h_{n-1}, \sigma_{Sk}(h_n)), (M_2', h_{n-2}), \ldots, (M_n', h_0) \rangle \quad (13)$$

3.3 Verification

The receiver can verify the signature by computing $h_n$ from $M'_1, \ldots, M'_k$ and $h_0=IV_0$. For each message block $M'_{n-i+1}$ (starting from the end, i=1 to i=n) if $M'_{n-i+1}$ is of the form $$M'_{n-i+1}=(d_i^{(1)}, \ldots, d_i^{(l-1)}, M_{n-i+1}^{(l)}, d_i^{(l+1)}, \ldots, d_i^{(k)})$$

then, the receiver computes ti $d_i^{(k)}=H(M_{n-i+1}^{(k)})$ $$h_i=H(h_{i-1}, d_i^{(1)}, \ldots, d_i^{(l-1)}, d_i, d_i^{(l+1)}, \ldots, d_i^{(k)}) \quad (14)$$

The receiver can then verify the signature on $h_n$ as normal using the verification algorithm v.

The alternative on-line verification procedure is straightforward. The receiver computes the partial hash $h_n$ from $(M'_1, h_{n-1})$ using relation (14) and then it verifies the signature on the partial hash $h_n$. Afterwards, for i=2, ..., n, it computes the partial hash $h_i$ from $(M'_i, h_{n-i})$ using (14) and verifies the so computed hash matches the hash value received in iteration i−1.

3.4 Performance

In addition to the advantages of the scheme of the first embodiment, the hash step of the scheme of the third embodiment can be iterated using a compression function with either the linear chaining scheme or a Merkle scheme.

By using a Merkle tree-like construction to hash down each sequence of blocks $M_i^{(1)}, \ldots, M_i^{(k)}$, bandwidth can be saved at the cost of more intensive computation (by the intermediate node).

4. Tree Scheme for Subsequence Authentication

The fourth embodiment of the present invention is a scheme for authenticating subsequences using Merkle Trees. Like the linear subsequence authentication scheme, the tree-based scheme allows stream authentication even when arbitrary blocks from the message are removed. As long as the blocks sent by the intermediate node are a proper subsequence of the original message, the receiver can authenticate the stream. By exploiting certain aspects of the tree structure, the tree scheme is more efficient with respect to bandwidth than the linear scheme.

4.1 Signing

Figure 10:
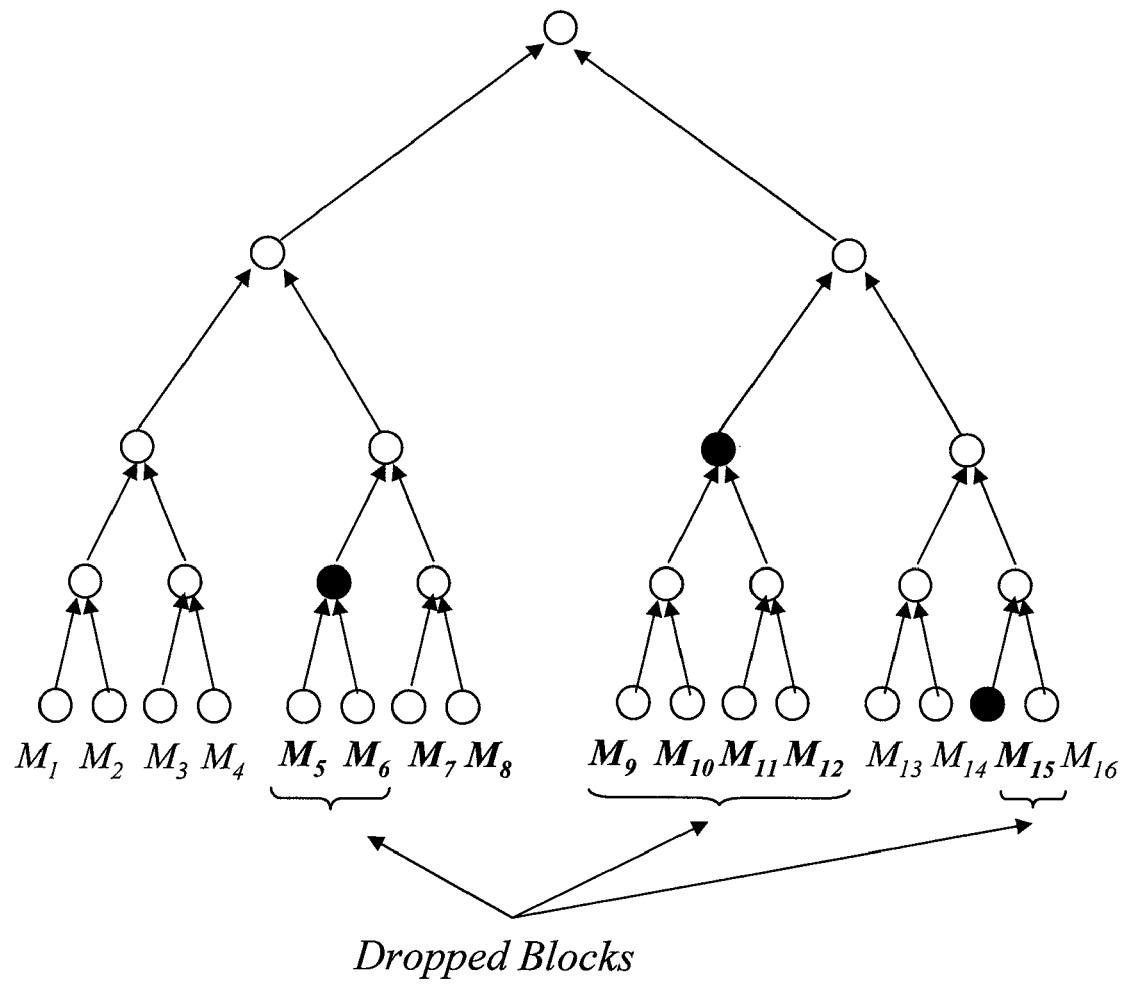
FIG. 10 illustrates a tree-based subsequence authentication scheme according to one embodiment of the present invention.

FIG. 10 illustrates a tree-based subsequence authentication scheme according to one embodiment of the present invention. Given a message $M=M_1 M_2 \ldots M_n$, the scheme of the fourth embodiment generates a Merkle tree shown in FIG. 6. If v denotes the root of the tree and x denotes the value associated with the root, then the initial sender transmits (M, $\sigma_{Sk}(x)$).

4.2 Signature Update

If an intermediary wants to strip off k arbitrarily located message blocks, the intermediary generates a resulting "message" M', identical to M, but with k blocks removed. The receiver needs to be able to authenticate M'. Let $d_1, \ldots, d_k$ denote the indices of the blocks that will be dropped and let $s_1, \ldots, s_{n-k}$ denote the blocks that will stay. Given the received n-block message M, the intermediate node computes the corresponding authentication information as follows.

1) For all blocks $M_{d_1}, \ldots, M_{d_k}$ that are to be dropped, the intermediary first determines the set of vertices corresponding to leaves $l_{d_1}, \ldots l_{d_k}$ in the Merkle tree associated with these blocks.

2) If any pair of vertices are siblings in the Merkle tree, the intermediary replaces these two vertices both with their parent.

3) The intermediary keeps repeating the above process until no two vertices in the set are siblings.

4) The intermediary takes this set of vertices, and computes the Merkle tree values $x_1, \ldots, x_r$ associated with them. The intermediary can easily perform this step since the cryptographic hash function is globally computable.

The intermediate node finally transmits $$\langle M_{s_1} \ldots M_{s_{n-k}}, \sigma_{Sk}(x), x_1, \ldots x_r \rangle \tag{15}$$

Similarly to other embodiments of the present invention, applying standard encoding to the block contents facilitates distinguishing between "message blocks" and "hashes".

4.3 Verification

The receiver verifies the signature by computing the value of the root of the Merkle tree, using the following algorithm:

1) For every actual message block $M_{S_i}$ received, compute the value $y_i = H(IV_0, M_{S_i})$.

2) Consider the set of all hashes $y_1, \ldots, y_{n-k}, x_1, \ldots, x_r$. Each of these corresponds to values of vertices in a Merkle tree.

3) For each pair of values, if they correspond to vertices who are siblings, then replace the pair with their hash (which corresponds to the parent node).

4) Repeat the above step until only one value remains—this value is the root.

If one has all the initial message blocks, then the above algorithm constitutes the standard algorithm for computing the root of a Merkle tree. Whenever the receiver receives some hashes $x_1, \ldots, x_r$, these come from the intermediary running the same algorithm on the subset of missing blocks. Therefore, the intermediary and receiver have together run the algorithm on all n blocks which yield the value of the Merkle root. This is why the above computation yields the Merkle root.

With the value of the Merkle root, the receiver can verify the signature it receives.

4.4 Security

The Merkle hash construction is collision resistant so long as the underlying hash function H is collision resistant. In particular, if one finds a collision in the Merkle tree, then at some point there is a collision at an internal node, which means one can find a collision on the hash function H. If an adversary can come up with a non-subsequence forgery (that is, come up with a message/signature pair that is not obtained by merely taking a subsequence of the original message), then one can demonstrate either a collision in the hash function or a forgery on the underlying signature scheme. Therefore, as long as the signature scheme is not easily susceptible to forgery and the hash function is not easily susceptible to collisions, the scheme of the fourth embodiment is secure.

4.5 Performance

When the intermediary removes blocks, it needs to provide the receiver with a sufficient number of internal hashes to compute the Merkle root of the tree without those message blocks. The intermediary will require k hashes for each of the blocks to be dropped and then at most k−1 hashes when replacing pairs of hashes with a single hash (since a single hash results in replacing two values with a single one, thereby reducing the net number by one). The total computation is therefore at most 2k−1 hashes. The total hashes computed by the intermediary are denoted by t.

When the receiver receives the stream, it needs to compute the root. If it has all the message blocks, this would require 2n−1 hashes−n to initially hash each block, and then n−1 additional hashes when replacing pairs of hash values with a single hash (since a single function computation results in replacing two values with a single one, and at the end only one value is remaining). However, t of these hashes are computed by the intermediary. Therefore the receiver only has to compute 2n−1−t hashes.

The total work in this scheme between the intermediary and the receiver is at most 2n−1 hashes. In the previous linear schemes 2n hashes were required.

In terms of bandwidth, the tree based scheme may be much more efficient. Only $r \leqq k$ hashes are finally sent. In the best case, if all k blocks to be dropped entirely constitute all leaves of a subtree in the Merkle tree, then only the single value corresponding to the root of this subtree is sent, that is r=1. In the worst case, if no pair of blocks are siblings, then the bandwidth requirements are the exact same as in the linear case, and k hash values need to be sent.

5. Tree Scheme for Simulcast Authentication

The fifth embodiment of the present invention is a tree-based scheme for authenticating multiple parallel streams in which one data block is selected from one stream at each step of the transmission. As in the linear multiplex setting of the third embodiment, it is assumed that the original sender S transmits k different streams $M^{(1)}, M^{(2)}, \ldots, M^{(k)}$ simultaneously. Each stream consists of n blocks of length b, $M^{(j)} = M_1^{(j)}, \ldots, M_n^{(j)}$. This scheme allows the intermediate node not only to select one stream and retransmit it in an authenticated fashion, but also to "switch" to some other stream adaptively (at any point during block transmission). Of course, the receiver is able to authenticate the resulting stream. As in the tree-based scheme for subsequence authentication of the fourth embodiment, the scheme of the fifth embodiment exploits certain aspects of the tree structure, so as to be more efficient with respect to bandwidth than the analogous linear scheme. On the other hand, like the tree construct of the fourth embodiment, the scheme of the fifth embodiment does not readily lend itself to online verification. Instead, the receiver has to wait for all packets before it can verify. In practice, the delay can be reduced by splitting the stream into segments of reasonable size and authenticating each segment separately.

5.1 Signing

Given k different streams $M^{(1)}, M^{(2)}, \ldots, M^{(k)}$, the signature generation of the scheme of the fifth embodiment works as follows.

1) The signer first generates a separate Merkle tree for each stream. Let $v^{(1)}, \ldots, v^{(k)}$ denote the k roots of the tree, and let $x^{(1)}, \ldots, x^{(k)}$ denote the respective values associated with these roots.

2) The signer then computes $x = H(IV, x^{(1)}, \ldots, x^{(k)})$. Here the hash function H can be computed using a Merkle tree construction as well.

3) Finally, the signer transmits $(M, \sigma_{Sk}(x))$.

5.2 Signature Update

Now, suppose an intermediate node wants to select a possibly different stream (message) for each message block received. For instance, if each message encodes a video stream of different quality, the intermediate node may want to select a lower or higher quality depending on network congestion. It generates a resulting "message" M', comprising "chunks" (consecutive message blocks) of the different streams. The receiver needs to be able to authenticate M'.

If the receiver can accurately compute each of the $x_i$ values, then it can verify the signature. Therefore, the intermediary simply has to provide the user with the information necessary to compute these values. By treating each Merkle tree separately, the intermediary can compute the set of required values as it did in the Merkle scheme of the fourth embodiment. The intermediary transmits these values to the receiver which can then compute the $x_i$ values and in-turn verify the authentication information.

Specifically, for each i with $1 \leq i \leq k$, let ks(i) denote the number of blocks that will actually be sent from stream $M^{(i)}$. For the stream $M^{(i)}$, let $s_1^{(i)}, \ldots, s_{ks(i)}^{(i)}$ denote the indices of the blocks that will be included. Let $M'^{(i)}$ denote these blocks:

$$M'(i) = M_{s_1^{(i)}}^{(i)} \ldots M_{s_{ks(i)}^{(i)}}^{(i)} \quad (16)$$

As to the indices of blocks that are to be dropped, for each i with $1 \leq i \leq k$, let kd(i) denote the number of blocks that will actually be dropped from stream $M^{(i)}$. For the stream $M^{(i)}$, let $d_1^{(i)}, \ldots, d_{kd(i)}^{(i)}$ denote the indices of the blocks that will be dropped.

As in the tree scheme of the fourth embodiment, for each stream $M^{(i)}$ the intermediary computes the values necessary for the receiver to verify as follows:

1) For all blocks $M_{d_1^{(i)}}^{(i)}, \ldots, M_{d_k^{(i)}}^{(i)}$ that are to be dropped, the intermediary first determines the set of vertices corresponding to leaves $l_{d_1^{(i)}}, \ldots, l_{d_{kd(i)}^{(i)}}$ in the Merkle tree associated with these blocks.

2) Now, if any pair of vertices are siblings in the Merkle tree, the intermediary replaces these two vertices both with their parent, i.e., the hash of concatenation of the values associated with the siblings.

3) The intermediary keeps repeating the above process until no two vertices in the set are siblings.

4) The intermediary takes this set of vertices, and computes the Merkle tree values $X^{(i)} = x_1^{(i)}, \ldots, x_r^{(i)}$ associated with them. The intermediary can easily perform this step since the cryptographic hash function is globally computable.

The intermediate node finally transmits the following information:

$$\langle \{M'^{(1)}, \ldots, M'^{(n)}\}, \sigma_{Sk}(x), X^{(1)}, \ldots, X^{(k)} \rangle \quad (17)$$

The stream is sent in the proper order, that is, blocks from each of the $M'^{(i)}$ may be interleaved so that the receiver can view the stream. Some standard encoding is applied to the block contents so the receiver can distinguish between message blocks versus hash values.

5.3 Verification

The receiver verifies the signature by first computing the values of the roots of each of the Merkle trees—after that it hashes these values and verifies the signature. It achieves this goal using the following algorithm which is run for each i:

1) First, for every actual message block $M_{sj}^{(i)}$ received, the receiver computes the value $y_j^{(i)} = H(IV_0, M_{sj}^{(i)})$.

2) Consider the set of all hashes computed above in the previous step as well the hash values contained in sets $X^{(1)}, \ldots, X^{(k)}$ received in the transmissions.

3) For each pair of values, if the pair corresponds to vertices who are siblings, then replace the pair with their hash (which corresponds to the parent node in the Merkle tree).

4) Repeat the above step until only one value remains—this value is the root $x^{(i)}$.

If one has all the initial message blocks, then the above algorithm constitutes the standard algorithm for computing the root of a Merkle tree. Whenever the receiver receives some hashes $x_1^{(i)}, \ldots, x_r^{(i)}$, these come from the intermediary running the same algorithm on the subset of missing blocks. Therefore, the intermediary and receiver have together run the algorithm on all n blocks which yield the value of the Merkle root. This is why the above computation yields the Merkle root.

With the values of the Merkle roots, $x^{(1)}, \ldots, x^{(k)}$, the receiver can compute $x = H(IV, x^{(1)}, \ldots, x^{(k)})$ and verify the signature it receives.

Figure 11:
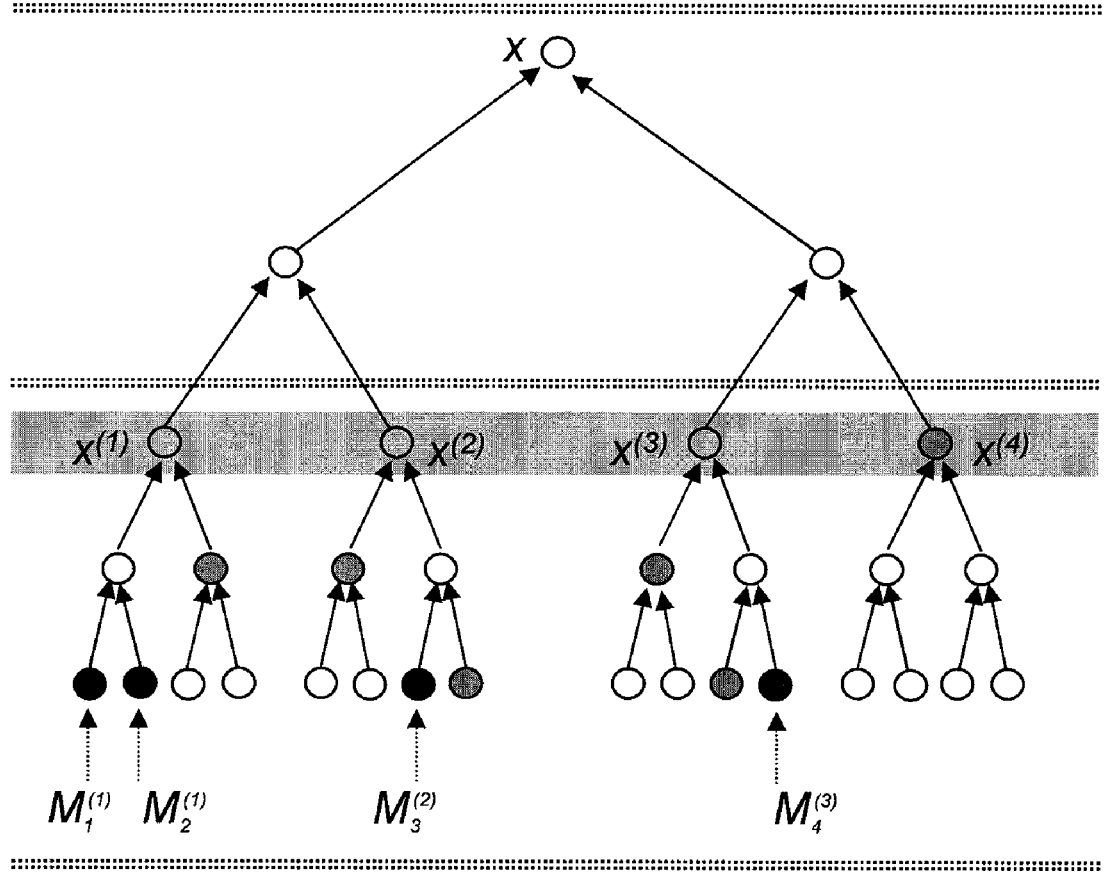
FIG. 11 illustrates a tree-based simulcast authentication scheme according to one embodiment of the present invention.

FIG. 11 illustrates the signing and verification of the fifth embodiment of the invention, an example with four streams and four message blocks. As shown, each of the four streams $M^{(1)}, M^{(2)}, M^{(3)}, M^{(4)}$ consists of four blocks. The black leaves denote the message blocks that are actually sent. The remaining ones are dropped. The shaded vertices represent the cover; that is, the values corresponding to these vertices are sent to the receiver. The roots of the four Merkle trees are $x^{(1)}, x^{(2)}, x^{(3)}$, and $X^{(4)}$ respectively. The final root value x is computed by hashing the Merkle roots $x^{(1)}, x^{(2)}, x^{(3)}, x^{(4)}$. This hash can be also be performed in a Merkle-like fashion. Finally, the value x is actually signed. In this scheme only six hash values are sent to the receiver. In the linear simulcast scheme, twelve hashes (three per each block transmitted) would have been transmitted. Thus, savings is achieved whenever dropped blocks are clustered. For example, in FIG. 11, all blocks in the stream $M^{(4)}$ are dropped. As a result, one only needs to send the root $x^{(4)}$ of the associated Merkle tree.

Also, because the Merkle roots are themselves hashed in a Merkle-like construction, there is room for further optimization. In particular, suppose that all blocks are dropped for two entire subtrees whose Merkle roots are siblings in the even larger tree. Then, instead of sending the two Merkle roots, their hash could be sent.

5.4 Security

Similarly to the fourth embodiment, the fifth embodiment is secure as long as the signature scheme is not easily susceptible to forgery, and the hash function is not easily susceptible to collisions. Thus the invention presented above is secure.

5.5 Performance

The performance of the fifth embodiment can be analyzed by extending the analysis for the tree-based subsequence scheme and the linear simulcast scheme.

In all embodiments above, a hash function with a specific payload size and a specific IV is used. The chaining constructions tend to take some existing output and use that as the IV of the next block. In a further embodiment, instead of loading the current output as an IV, the current output can be concatenated to the next payload.

The linear and tree schemes of the present invention can be combined to obtain hybrid solutions, giving rise to useful tradeoffs. In a further embodiment, a scheme starts by splitting each stream $M^{(i)}$ into segments of length b blocks. Then, a tree scheme is applied on the first segment of all streams to compute the Merkle root $x_1$, then the root on the second segment, and so on, until all segments are processed. In this way, Merkle roots $x_1, \ldots, x_{\lfloor n/b \rfloor}$ are obtained. Instead of signing each one of these roots, as in the tree schemes described above, the roots are combined using the linear scheme. Hence, if the receiver can buffer b blocks, then verification can be done "on-line". Moreover, the communication overhead is decreased compared to the plain linear scheme since for each segment of b blocks, the number of transmitted hashes may be much less than the number of dropped blocks (although equal on the worst case). A similar approach can be taken for subsequence authentication. This hybrid approach allows trading buffer space for communication overhead.

In a further embodiment, a linear scheme is applied to each stream, and then a Merkle tree is computed on the results.

Although the embodiments described above use binary Merkle trees, the constructions can be applied to general trees. It may be more advantageous to group certain blocks together if they have similar behavior; i.e., they either all will be dropped or all will be kept.

If there are correlations among blocks, then it makes sense to cluster these blocks together in the tree-based schemes. For example, if a group of blocks will either all be dropped or all be kept, it is advantageous to have these blocks constitute all the leaves of a subtree. Then, if the packets are dropped, only the root of the subtree must be sent.

In addition, the Merkle tree construction could be optimized. In one embodiment, if one of the streams will more likely be used than the others, it is advantageous to use a lopsided Merkle tree in which the priority stream is close to the root (e.g., perhaps right below it). In conjunction with the hybrid scheme mentioned previously, the streams are prioritized, so that the high priority streams are closer to the final value in the chain. This ordering particularly makes sense when layered streams are used. In such cases, the verification requires fewer hash steps to reach the root.

There are blocks that should never be dropped, such as, an I frame in an MPEG stream, or the base layer in a scalably coded stream. The signer can avoid directly computing the initial first-layer hash on a block that will not be dropped. In the linear schemes, there are two hash layers. If a block will not be dropped, then there is no need to compute the hash in the first layer; instead only the second layer needs to be computed.

The schemes of the present invention can be interpreted as having two phases. In the first phase, it finds a convenient way to hash each data block. In the second phase, it signs the hashes. The reason for doing so is that if a block is dropped, it is not necessary to retransmit it in its entirety. Instead, only the hash computed in the first phase is transmitted. This information is sufficient to allow the receiver to verify, since the signature can be viewed as being performed on the hashes.

As already mentioned, the present invention deals with a case of controlled loss—that is, the sender drops particular blocks on purpose. Of course, in many practical applications, one may have to deal with uncontrolled loss situations. These situations may occur, for example, if the transport protocol is not reliable such as the case with UDP, or if the environment is subject to lossy behavior such as is the case with wireless networks. The present invention can be used to deal with the uncontrolled loss by replicating the hashes that would be sent if the packet were dropped.

By applying Forward Error Correction (FEC) techniques such as Erasure Codes to the hashes of the present invention, it is possible to deal with the uncontrolled loss situation without having to replicate. This approach might be especially useful in a multicast setting where different receivers have lost different packets but can be provided with identical error-correcting information. One consideration of this approach is that the receiver must perform a decoding step so may have to compromise the ability to verify authentication information in an online manner.

Moreover, schemes of the present invention involve an intermediary which can adaptively choose the amount of forward error correction to the authentication information (i.e., hash outputs). In other words, rather than having a source estimate how much loss will occur and include sufficient authentication forward error correction information to accommodate that, the source can choose not to include authentication forward error correction information at all, and instead allow an intermediary to include the authentication forward error correction information dynamically to further increase the probability that the stream can be authenticated.

The intermediary becomes an integral part of a scheme which considers both uncontrolled losses handled through forward error correction as well as adaptive and intelligent controlled losses. For example, in the Merkle tree constructions, it may suffice for the recipient to recover intermediate nodes (as opposed to just leaf nodes). In such a case, the intermediary can choose to supply forward error correction information to allow recovery of the (possibly interior) nodes necessary to authenticate, thus requiring possibly less forward error correction information.

If the intermediary is sending different versions of the same stream to multiple receivers, because, for example, each has a different resource constraint with respect to the quality they view, the intermediary can recycle the work effort. In particular, the intermediary can store and reuse any first-layer hash. As a result, it will need to compute at most one full set of first-layer hashes.

Along these lines, work can be recycled between the source and the intermediary. That is, the source can provide the intermediary with any necessary hash computations for assisting with authentication. Then, the intermediary is not required to perform any work of a cryptographic nature. Instead, it can choose which blocks to drop and select the corresponding authentication information to be transmitted.

Another application of the present invention is insertion and selection of advertisements in a stream. The intermediary or some other party provides advertisements or a hash of advertisements, for example hashed using a Merkle tree, to the source. The source then includes the Merkle hash in its stream as a placeholder, allowing the intermediary to choose which advertisement it would like to use. Of course, this concept is not necessarily limited to advertisers.

Although the focus of the present invention is on authenticating information, the above scheme can also be used in conjunction with an encryption scheme provided that the scheme is designed to permit the recipient to decrypt a given block without requiring the decryption of or presence of many other blocks. Two block cipher encryption modes facilitate this approach. One is counter-mode encryption and the other is electronic code book (ECB) encryption. Alternatively, it is possible to use a stream cipher, though a caveat is that the receiver may need to perform work that is proportional to the size of the original stream as opposed to the portion of it that he receives. One may be able to use chaining or feedback modes (cipher block chaining (CBC), output feed back (OFB), etc) provided that the receiver receives any intermediate information to decrypt. Such information may include intermediate IVs or actual ciphertext blocks. Yet another approach is to mix the modes, i.e., for large segments which will not be dropped, a chaining or feedback mode can be used; whereas for other blocks, a counter mode or ECB mode can be used. For example, in an MPEG stream, I-frames are never dropped intentionally, so they can be treated differently and encrypted using CBC mode. A similar remark applies to the base layer of any scalable coding scheme.

While the invention has been described in detail above with respect to various embodiments, the ordinarily skilled artisan will appreciate that variations of these embodiments are possible without departing from the scope and spirit of the invention. Therefore, the invention should be considered as limited only by the scope of the appended claims.

What is claimed is:

1. A method for transmitting to a recipient, over a communications network, a plurality of data streams $M^{(1)}, \ldots, M^{(k)}$ where k is greater than one, wherein each data stream $M^{(j)}$ (j is from 1 to k inclusive) comprises a first sequence of data blocks $M^{(j)}_1, \ldots, M^{(j)}_n$ where n is greater than one, the method comprising:

(A) for each data block $M^{(j)}_i$, determining, by a machine, a corresponding first-layer value which is either a hash of an input comprising the data block $M^{(j)}_i$ or is equal to the data block $M^{(j)}_i$, wherein for at least one data block $M^{(j)}_i$, the corresponding first-layer value is the hash of an input comprising the data block $M^{(j)}_i$;

(B) obtaining, by the machine, an authentication value which comprises a digital signature or a message authentication code on a value $h_m$ which is the last value in a sequence of second-layer hash values $h_1, \ldots, h_m$, wherein for each l from 1 and m inclusive, the corresponding second-layer hash value $h_l$ is associated with a set $S_l$ of one or more data blocks $M^{(j)}_i$ and is a hash of one or more inputs comprising:

(i) the first-layer value for each data block $M^{(j)}_i$ in the associated set $S_l$ of one or more data blocks $M^{(j)}_i$; and (ii) if l is greater than 1, then the one or more inputs comprise $h_{l-1}$, wherein for each data stream $M^{(j)}$, the data stream $M^{(j)}$ comprises data blocks from at least two sets $S_l$, and for any two sets $S_{l_1}$ and $S_{l_2}$ each of which has one or more blocks in $M^{(j)}$ and such that $l_2$ is greater than $l_1$, each block in $M^{(j)}$ and $S_{l_2}$ precedes each block in $M^{(j)}$ and $S_{l_1}$;

wherein each set $S_l$ comprises data blocks from different data streams;

(C) for each set $S_l$, selecting, from the set $S_l$, zero or more data blocks ("selected data blocks") to be transmitted to the recipient, wherein the remaining data blocks of the set $S_l$ are not to be transmitted to the recipient, and obtaining a corresponding value ("M'-value") $M'_l$ to be transmitted to the recipient, wherein the M'-value $M'_l$ comprises each selected data block and also comprises, for each non-selected data block, a corresponding first-layer value which is a hash of an input comprising the non-selected data block;

wherein at least one set $S_l$ comprises a selected block and an unselected block which belong to respective different streams, and each set $S_l$ comprises a non-selected block;

(D) transmitting to the recipient over the communications network, by the machine, the authentication value and the values $M'_l$ for all l from 1 to m inclusive.

2. The method of claim 1 wherein for each l between 1 and m inclusive, only one data block is selected.

3. The method of claim 1 further comprising transmitting to the recipient over the communications network, by the machine, the values $h_l$ other than $h_m$;

wherein for each second-layer hash value $h_l$ transmitted to the recipient and such that l is greater than 1 and less than m, the second-layer hash value $h_l$ and the corresponding value $M'_l$ are transmitted before any second-layer hash value preceding $h_{l-1}$ in the second sequence and before any M'-value corresponding to any second-layer hash value preceding $h_l$; and wherein the authentication value is transmitted before any M'-value $M'_l$ corresponding to any second-layer hash value $h_l$ other than $h_{m-1}$.

4. The method of claim 1 further comprising transmitting to the recipient over the communications network, by the machine, the values $h_l$ other than $h_m$;

wherein for each second-layer hash value $h_l$ transmitted to the recipient and such that l is greater than 1 and less than m, the second-layer hash value $h_l$ and the corresponding value $M'_l$ are transmitted before any second-layer hash value preceding $h_l$ in the second sequence and before any M'-value corresponding to any second-layer hash value preceding $h_l$; and wherein the authentication value is transmitted before any M'-value $M'_l$ corresponding to any second-layer hash value $h_l$ other than $h_{m-1}$.

5. The method of claim 1 wherein at least one set $S_l$ comprises at least one data block selected based on network congestion.

6. The method of claim 5 wherein different streams comprise information encoded with respective different quality.

7. The method of claim 5 wherein m=n, and for each l between 1 and m inclusive, there is a value i (different values l corresponding to respective different values i) such that the set $S_l$ consists of the blocks $M^{(1)}_i, \ldots, M^{(k)}_i$.

8. The method of claim 1 wherein for each l between 1 and m inclusive, there is a value i such that the set $S_l$ comprises the blocks $M^{(1)}_i, \ldots, M^{(k)}_i$.

9. The method of claim 8 wherein each set $S_l$ comprises a data block selected based on network congestion.

10. The method of claim 9 wherein different streams comprise information encoded with respective different quality.

11. The method of claim 1 wherein each set $S_l$ comprises a selected data block.

12. The method of claim 1 wherein each data block belongs to at least one set $S_l$.

13. The method of claim 12 wherein each data block belongs to exactly one set $S_l$.

14. The method of claim 1 wherein each set $S_l$ comprises at least one data block from each data stream.

15. An authentication method comprising:

(1) receiving over a communications network, by a machine: (i) an authentication value; and (ii) a plurality of values $M'_1, \ldots, M'_n$ where n is greater than one;

(2) verifying by the machine whether or not the values $M'_1, \ldots, M'_n$ were obtained by a transmitting method which is for transmitting to a recipient, over a communications network, a plurality of data streams $M^{(1)}, \ldots, M^{(k)}$ where k is greater than one, wherein each data stream $M^{(j)}$ (j is from 1 to k inclusive) comprises a first sequence of data blocks $M^{(j)}_1, \ldots, M^{(j)}_n$ where n is greater than one, the transmitting method comprising:

(A) for each data block $M^{(j)}_i$, determining a corresponding first-layer value which is either a hash of an input comprising the data block $M^{(j)}_i$ or is equal to the data block $M^{(j)}_i$, wherein for at least one data block $M^{(j)}_i$, the corresponding first-layer value is the hash of an input comprising the data block $M^{(j)}_i$;

(B) obtaining an authentication value which comprises a digital signature or a message authentication code on a value $h_m$ which is the last value in a sequence of second-layer hash values $h_1, \ldots, h_m$, wherein for each l from 1 and m inclusive, the corresponding second-layer hash value $h_l$ is associated with a set $S_l$ of one or more data blocks $M_{(j)_i}$ and is a hash of one or more inputs comprising:

(i) the first-layer value for each data block $M^{(j)}_i$ in the associated set $S_l$ of one or more data blocks $M^{(j)}_i$; and (ii) if l is greater than 1, then the one or more inputs comprise $h_{l-1}$, wherein for each data stream $M^{(j)}$, the data stream $M^{(j)}$ comprises data blocks from at least two sets $S_l$, and for any two sets $S_{l_1}$ and $S_{l_2}$ each of which has one or more blocks in $M^{(j)}$ and such that $l_2$ is greater than $l_1$, each block in $M^{(j)}$ and $S_{l_2}$ precedes each block in $M^{(j)}$ and $S_{l_1}$;

wherein each set $S_l$ comprises data blocks from different data streams;

for each set $S_l$, selecting, from the set $S_l$, zero or more data blocks ("selected data blocks") to be transmitted to the recipient, wherein the remaining data blocks of the set $S_l$ are not to be transmitted to the recipient, and obtaining a corresponding value ("M'-value") $M'_l$ to be transmitted to the recipient, wherein the M'-value $M'_l$ comprises each selected data block and also comprises, for each non-selected data block, a corresponding first-layer value which is a hash of an input comprising the non-selected data block;

wherein at least one set $S_l$ comprises a selected block and an unselected block which belong to respective different streams, and each set $S_l$ comprises a non-selected block;

(D) transmitting to the recipient over the communications network, by the machine, the authentication value and the values $M'_l$ for all l from 1 to m inclusive;

wherein operation (2) comprises:
- (2A-1) calculating the value $h_1$ from the received values $M'_1, \ldots, M'_l$, the value $h_m$ being calculated in accordance with the hash of the operation (B); and
- (2A-2) verifying the received authentication value on the calculated value $h_m$.

16. The authentication method of claim 15 wherein:

the operation (1) further comprises receiving over the communications network, by the machine, one or more of values $h_1, \ldots, h_{m-1}$ where m is an integer greater than one;

wherein in the operation (2A-1) the value $h_m$ is calculated from the received value $h_{m-1}$ and the one or more received values $M'_i$ in the set $S_m$ associated with the second-layer hash value $h_m$; and the operation (2A-1) further comprises, for each set $S_l$ associated with a received value $h_l$ for l is greater than 1 and less than m, authenticating the received value $M'_l$ in an operation comprising:
- (2B-1) calculating a value $h_l$ from the received value $h_{l-1}$ and the received value $M'_l$; and
- (2B-2) verifying that the calculated value $h_l$ is equal to the received value $h_l$.

17. The authentication method of claim 16 wherein the calculation of the value $h_m$ and the verification of the authentication value is performed before the operations (2B-1) and (2B-2), and wherein for each set $S_l$ such that l is greater than 1, the operations (2B-1) and (2B-2) are performed before they are performed for any set associated with a second-layer hash value $h_t$ with t is greater than 1.

18. The method of claim 15 wherein at least one set $S_l$ comprises at least one data block selected based on network congestion.

19. The method of claim 18 wherein different streams comprise information encoded with respective different quality.

20. The method of claim 15 wherein each set $S_l$ comprises a selected data block.

21. The method of claim 15 wherein for at least one l between 1 and m inclusive, there is a value i such that the set $S_l$ comprises the blocks $M^{(1)}_i, \ldots, M^{(k)}_i$.

22. The method of claim 15 wherein each data block belongs to at least one set $S_l$.

23. The method of claim 22 wherein each data block belongs to exactly one set $S_l$.

24. The method of claim 15 wherein each set $S_l$ comprises at least one data block from each data stream.

25. A non-transitory computer storage storing a processor-executable program code for performing a method for transmitting to a recipient, over a communications network, a plurality of data streams $M^{(1)}, \ldots, M^{(k)}$ where k is greater than one, wherein each data stream $M^{(j)}$ (j is from 1 to k inclusive) comprises a first sequence of data blocks $M^{(j)}_1, \ldots, M^{(j)}_n$ where n is greater than one, the method comprising:

(A) for each data block $M^{(j)}_i$, determining, by a machine, a corresponding first-layer value which is either a hash of an input comprising the data block $M^{(j)}_i$ or is equal to the data block $M^{(j)}_i$, wherein for at least one data block $M^{(j)}_i$, the corresponding first-layer value is the hash of an input comprising the data block $M^{(j)}_i$;

(B) obtaining, by the machine, an authentication value which comprises a digital signature or a message authentication code on a value $h_m$ which is the last value in a sequence of second-layer hash values $h_1, \ldots, h_m$, wherein for each l from 1 and m inclusive, the corresponding second-layer hash value $h_l$ is associated with a set $S_l$ of one or more data blocks $M^{(j)}_i$ and is a hash of one or more inputs comprising:
- (i) the first-layer value for each data block $M^{(j)}_i$ in the associated set $S_l$ of one or more data blocks $M^{(j)}_i$; and
- (ii) if l is greater than 1, then the one or more inputs comprise $h_{l-1}$, wherein for each data stream $M^{(j)}$, the data stream $M^{(j)}$ comprises data blocks from at least two sets $S_l$, and for any two sets $S_{l_1}$ and $S_{l_2}$ each of which has one or more blocks in $M^{(j)}$ and such that $l_2$ is greater than $l_1$, each block in $M^{(j)}$ and $S_{l_2}$ precedes each block in $M^{(j)}$ and $S_{l_1}$;

wherein each set $S_l$ comprises data blocks from different data streams;

(C) for each set $S_l$, selecting, from the set $S_l$, zero or more data blocks ("selected data blocks") to be transmitted to the recipient, wherein the remaining data blocks of the set $S_l$ are not to be transmitted to the recipient, and obtaining a corresponding value ("M'-value") $M'_l$ to be transmitted to the recipient, wherein the M'-value $M'_l$ comprises each selected data block and also comprises, for each non-selected data block, a corresponding first-layer value which is a hash of an input comprising the non-selected data block;

wherein at least one set $S_l$ comprises a selected block and an unselected block which belong to respective different streams, and each set $S_l$ comprises a non-selected block;

(D) transmitting to the recipient over the communications network, by the machine, the authentication value and the values $M'_l$ for all l from 1 to m inclusive.

26. The non-transitory computer storage of claim 25 wherein for each l between 1 and m inclusive, only one data block is selected.

27. The non-transitory computer storage of claim 25 wherein the method further comprises transmitting to the recipient over the communications network, by the machine, the values $h_l$ other than $h_m$;

wherein for each second-layer hash value $h_l$ transmitted to the recipient and such that l is greater than 1 and less than m, the second-layer hash value $h_l$ and the corresponding value $M'_l$ are transmitted before any second-layer hash value preceding $h_{l-1}$ in the second sequence and before any M'-value corresponding to any second-layer hash value preceding $h_l$; and wherein the authentication value is transmitted before any M'-value $M'_l$ corresponding to any second-layer hash value $h_l$ other than $h_{m-1}$.

28. The non-transitory computer storage of claim 15 wherein the method further comprises transmitting to the recipient over the communications network, by the machine, the values $h_l$ other than $h_m$;
    wherein for each second-layer hash value $h_l$ transmitted to the recipient and such that l is greater than 1 and less than m, the second-layer hash value $h_l$ and the corresponding value $M'_l$ are transmitted before any second-layer hash value preceding $h_l$ in the second sequence and before any M'-value corresponding to any second-layer hash value preceding $h_l$; and
    wherein the authentication value is transmitted before any M'-value $M'_l$ corresponding to any second-layer hash value $h_l$ other than $h_{m-1}$.

29. The non-transitory computer storage of claim 25 wherein at least one set $S_l$ comprises at least one data block selected based on network congestion.

30. The non-transitory computer storage of claim 29 wherein different streams comprise information encoded with respective different quality.

31. The non-transitory computer storage of claim 29 wherein m=n, and for each l between 1 and m inclusive, there is a value i (different values l corresponding to respective different values i) such that the set $S_l$ consists of the blocks $M^{(1)}_i, \ldots, M^{(k)}_i$.

32. The non-transitory computer storage of claim 25 wherein for each l between 1 and m inclusive, there is a value i such that the set $S_l$ comprises the blocks $M^{(1)}_i, \ldots, M^{(k)}_i$; wherein each set $S_l$ comprises a data block selected based on network congestion.

33. The non-transitory computer storage of claim 25 wherein for each l between 1 and m inclusive, there is a value i such that the set $S_l$ comprises the blocks $M^{(1)}_i, \ldots, M^{(k)}_i$.

34. An apparatus comprising the computer storage of claim 25 in combination with at least one processor for executing the program code.

35. A first apparatus comprising the non-transitory computer storage of claim 27 and at least one processor for executing the program code, in combination with a second apparatus connected to the communication network, the second apparatus comprising a computer storage storing a processor-executable program code and comprising at least one processor for executing the program code of the second apparatus,
    wherein the program code of the second apparatus is for performing an authentication method comprising:
    receiving over the communications network, from the first apparatus: (i) the authentication value; and (ii) the plurality of values $M'_1, \ldots, M'_n$;
    calculating the value $h_m$ from the received values $M'_1, \ldots, M'_n$, the value $h_m$ being calculated in accordance with the hash of the operation (B); and
    verifying the received authentication value on the calculated value $h_m$.

36. A first apparatus comprising the non-transitory computer storage of claim 28 and at least one processor for executing the program code, in combination with a second apparatus connected to the communication network, the second apparatus comprising a computer storage storing a processor-executable program code and comprising at least one processor for executing the program code of the second apparatus,
    wherein the program code of the second apparatus is for performing an authentication method comprising:
    obtaining the data blocks;
    calculating the authentication value from the data blocks; and
    sending the data blocks and the authentication value to the first apparatus over the communication network.

37. A non-transitory computer storage storing a processor-executable program code for performing an authentication method comprising:
    (1) receiving over a communications network, by a machine: (i) an authentication value; and (ii) a plurality of values $M'_1, \ldots, M'_n$ where n is greater than one;
    (2) verifying by the machine whether or not the values $M'_1, \ldots, M'_n$ were obtained by a transmitting method which is for transmitting to a recipient, over a communications network, a plurality of data streams $M^{(1)}, \ldots, M^{(k)}$ where k is greater than one, wherein each data stream $M^{(j)}$ (i is from 1 to k inclusive) comprises a first sequence of data blocks $M^{(j)}_1, \ldots, M^{(j)}_n$ where n is greater than one, the transmitting method comprising:
    (A) for each data block $M^{(j)}_i$, determining a corresponding first-layer value which is either a hash of an input comprising the data block $M^{(j)}_i$ or is equal to the data block $M^{(j)}_i$, wherein for at least one data block $M^{(j)}_i$, the corresponding first-layer value is the hash of an input comprising the data block $M^{(j)}_i$;
    (B) obtaining an authentication value which comprises a digital signature or a message authentication code on a value $h_m$ which is the last value in a sequence of second-layer hash values $h_1, \ldots, h_m$ wherein for each l from 1 and m inclusive, the corresponding second-layer hash value $h_l$ is associated with a set $S_l$ of one or more data blocks $M^{(j)}_i$ and is a hash of one or more inputs comprising:
    (i) the first-layer value for each data block $M^{(j)}_i$ in the associated set $S_l$ of one or more data blocks $M^{(j)}_i$; and
    (ii) if l is greater than 1, then the one or more inputs comprise $h_{l-1}$,
    wherein for each data stream $M^{(j)}$, the data stream $M^{(j)}$ comprises data blocks from at least two sets $S_l$, and for any two sets $S_{l_1}$ and $S_{l_2}$ each of which has one or more blocks in $M^{(j)}$ and such that $l_2$ is greater than $l_1$, each block in $M^{(j)}$ and $S_{l_2}$ precedes each block in $M^{(j)}$ and $S_{l_1}$;
    wherein each set $S_l$ comprises data blocks from different data streams;
    for each set $S_l$, selecting, from the set $S_l$, zero or more data blocks ("selected data blocks") to be transmitted to the recipient, wherein the remaining data blocks of the set $S_l$ are not to be transmitted to the recipient, and obtaining a corresponding value ("M'-value") $M'_l$ to be transmitted to the recipient, wherein the M'-value $M'_l$ comprises each selected data block and also comprises, for each non-selected data block, a corresponding first-layer value which is a hash of an input comprising the non-selected data block;
    wherein at least one set $S_l$ comprises a selected block and an unselected block which belong to respective different streams, and each set $S_l$ comprises a non-selected block;
    (D) transmitting to the recipient over the communications network, by the machine, the authentication value and the values $M'_l$ for all l from 1 to m inclusive;
    wherein operation (2) comprises:
    (2A-1) calculating the value $h_m$ from the received values $M'_1, \ldots, M'_l$, the value $h_m$ being calculated in accordance with the hash of the operation (B); and
    (2A-2) verifying the received authentication value on the calculated value $h_m$.

38. The non-transitory computer storage of claim 37 wherein:
    the operation (1) further comprises receiving over the communications network, by the machine, one or more of values $h_1, \ldots, h_{m-1}$ where m is an integer greater than one;

wherein in the operation (2A-1) the value $h_m$ is calculated from the received value $h_{m-1}$ and the one or more received values $M'_i$ in the set $S_m$ associated with the second-layer hash value $h_m$; and the operation (2A-1) further comprises, for each set $S_l$ associated with a received value $h_l$ for l is greater than 1 and less than m, authenticating the received value $M'_i$ in an operation comprising:

(2B-1) calculating a value $h_l$ from the received value $h_{l-1}$ and the received value $M'_i$; and (2B-2) verifying that the calculated value $h_l$ is equal to the received value $h_l$.

39. The non-transitory computer storage of claim 38 wherein the calculation of the value $h_m$ and the verification of the authentication value is performed before the operations (2B-1) and (2B-2), and wherein for each set $S_l$ such that l is greater than 1, the operations (2B-1) and (2B-2) are performed before they are performed for any set associated with a second-layer hash value $h_t$ with t is greater than l.

40. The non-transitory computer storage of claim 37 wherein at least one set $S_l$ comprises at least one data block selected based on network congestion.

41. An apparatus comprising the computer storage of claim 37 in combination with at least one processor for executing the program code.

42. A method for transmitting to a recipient, over a communications network, a plurality of data streams $M^{(1)}, \ldots, M^{(k)}$ where k is greater than one, wherein each data stream $M^{(j)}$ (j is from 1 to k inclusive) comprises a first sequence of data blocks $M^{(j)}_1, \ldots, M^{(j)}_n$ where n is greater than one, the method comprising:

(A) for each data block $M^{(j)}_i$, determining, by a machine, a corresponding first-layer value which is either a hash of an input comprising the data block $M^{(j)}_i$, or is equal to the data block $M^{(j)}_i$, wherein for at least one data block $M^{(j)}_i$, the corresponding first-layer value is the hash of an input comprising the data block $M^{(j)}_i$;

(B) obtaining, by the machine, an authentication value which comprises a digital signature or a message authentication code on a value $h_m$ which is the last value in a sequence of second-layer hash values $h_1, \ldots, h_m$, wherein for each l from 1 and m inclusive, the corresponding second-layer hash value $h_l$ is associated with a set $S_l$ of one or more data blocks $M^{(j)}_i$ and is a hash of one or more inputs comprising:

(i) the first-layer value for each data block $M^{(j)}_i$ in the associated set $S_l$ of one or more data blocks $M^{(j)}_i$; and (ii) if l is greater than 1, then the one or more inputs comprise $h_{l-1}$, wherein for each data stream $M^{(j)}$, the data stream $M^{(j)}$ comprises data blocks from at least two sets $S_l$, and for any two sets $S_{l_1}$ and $S_{l_2}$ each of which has one or more blocks in $M^{(j)}$ and such that $l_2$ is greater than $l_1$, each block in $M^{(j)}$ and $S_{l_2}$ precedes each block in $M^{(j)}$ and $S_{l_1}$;

wherein each set $S_l$ comprises data blocks from different data streams;

(C) transmitting to the recipient over the communications network, by the machine, the authentication value and each said data block of each said stream.

43. The method of claim 42 wherein each data block belongs to at least one set $S_l$.

44. The method of claim 43 wherein each data block belongs to exactly one set $S_l$.

45. The method of claim 42 wherein each set $S_l$ comprises at least one data block from each data stream.

* * * * *